Dec. 6, 1955 W. J. SCHIESER ET AL 2,726,061
WEIGHING AND CHECKWEIGHING MACHINE
Filed Oct. 21, 1952 8 Sheets-Sheet 1
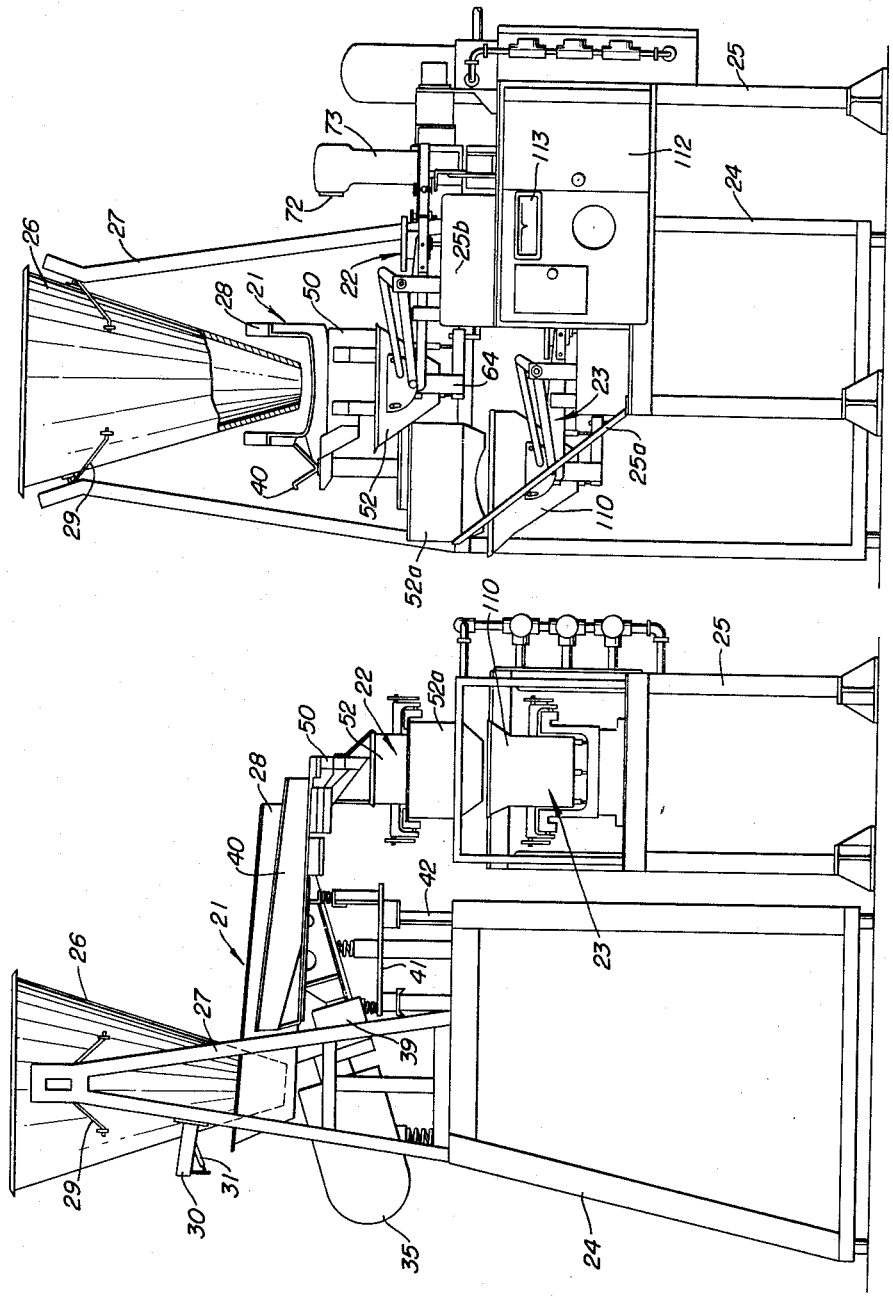
INVENTORS.
Warren J. Schieser
John F. Kelley
BY Richard M. White
Lawrence W. Hoffman
Cubett, *(signature)* & Miller
ATTORNEYS.

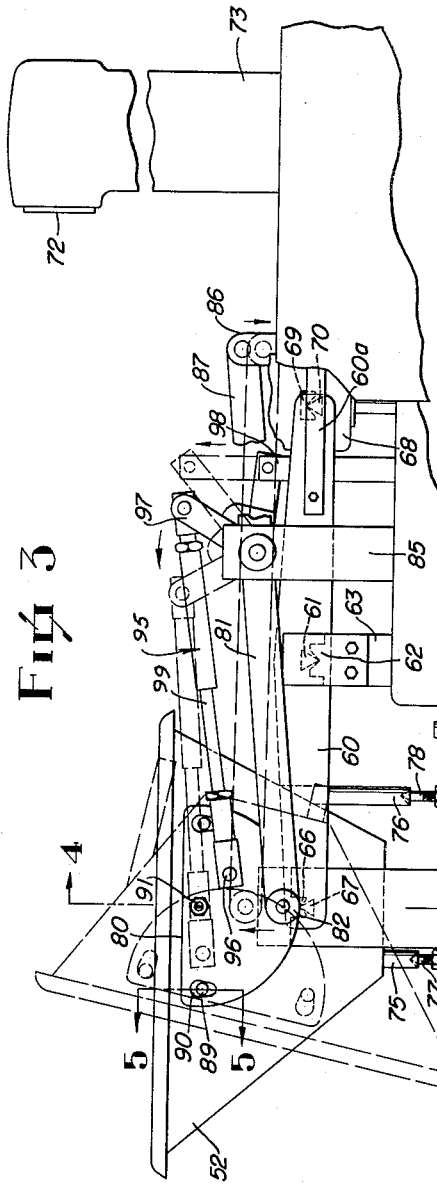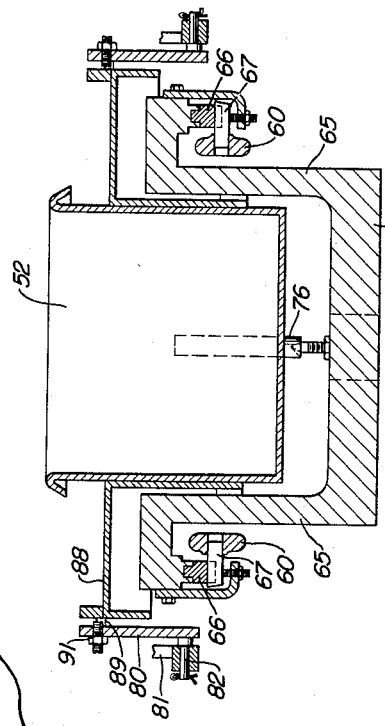

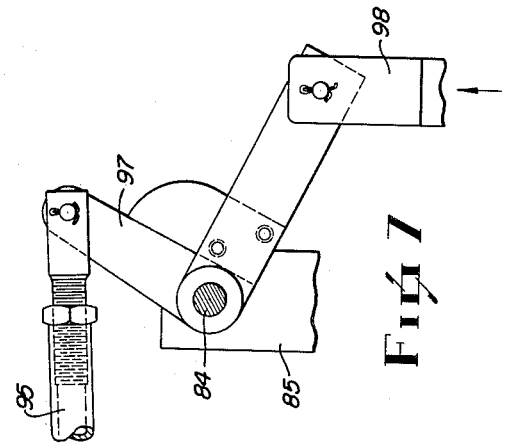
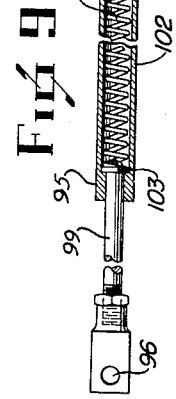
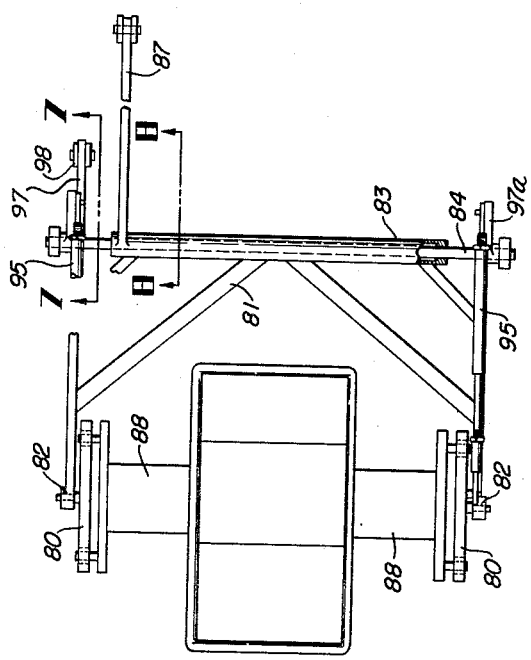
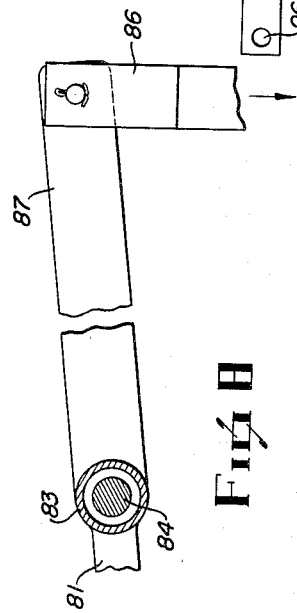

Dec. 6, 1955 W. J. SCHIESER ET AL 2,726,061
WEIGHING AND CHECKWEIGHING MACHINE
Filed Oct. 21, 1952 8 Sheets-Sheet 4
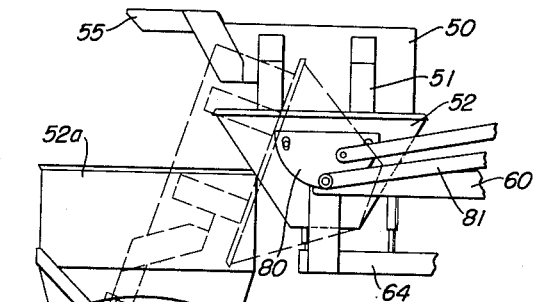
Fig 10
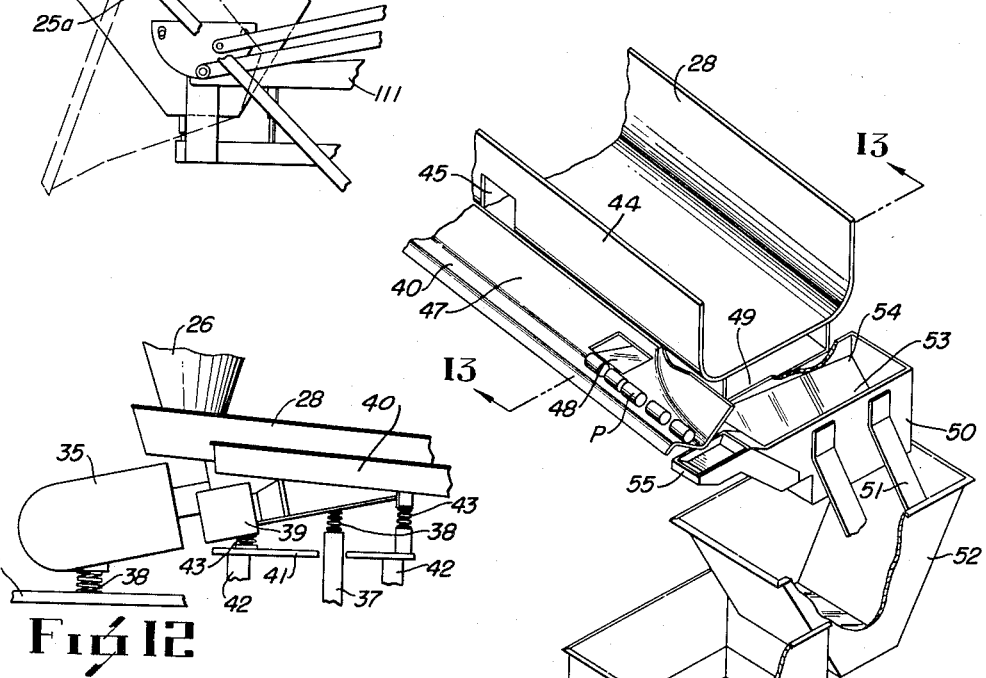
Fig 12
Fig 11
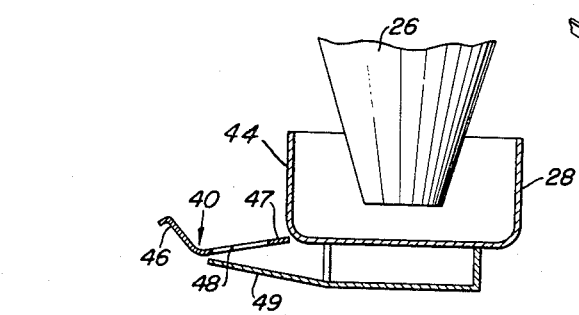
Fig 13
INVENTORS.
Warren J. Schieser
John F. Kelley
Richard M. White
Lawrence W. Hoffman
BY
ATTORNEYS.

Dec. 6, 1955  W. J. SCHIESER ET AL  2,726,061
WEIGHING AND CHECKWEIGHING MACHINE
Filed Oct. 21, 1952  8 Sheets-Sheet 5
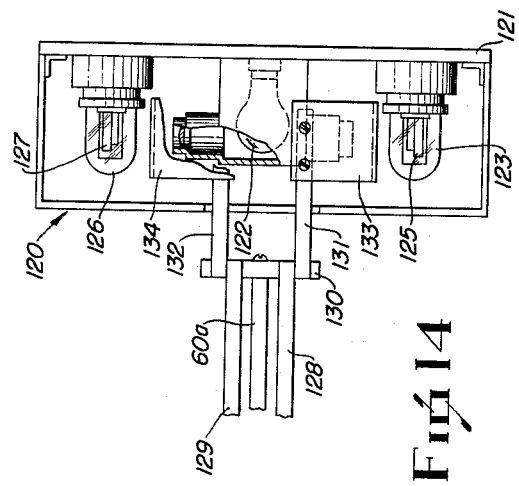
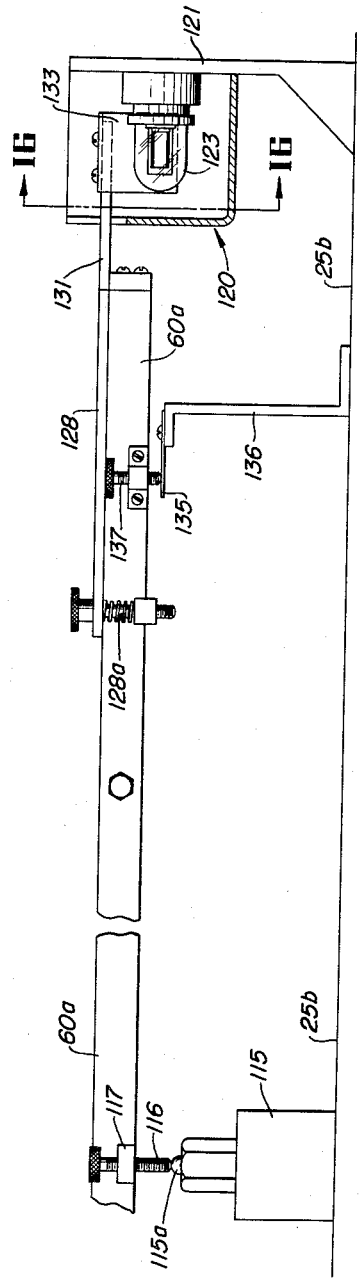
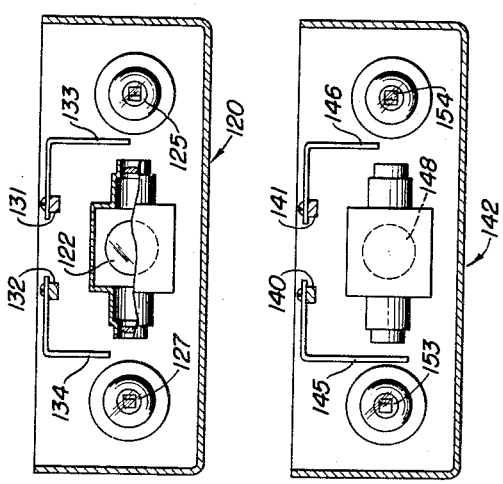
INVENTORS.
Warren J. Schieser
John F. Kelley
BY Richard M. White
Lawrence W. Hoffman
ATTORNEYS.

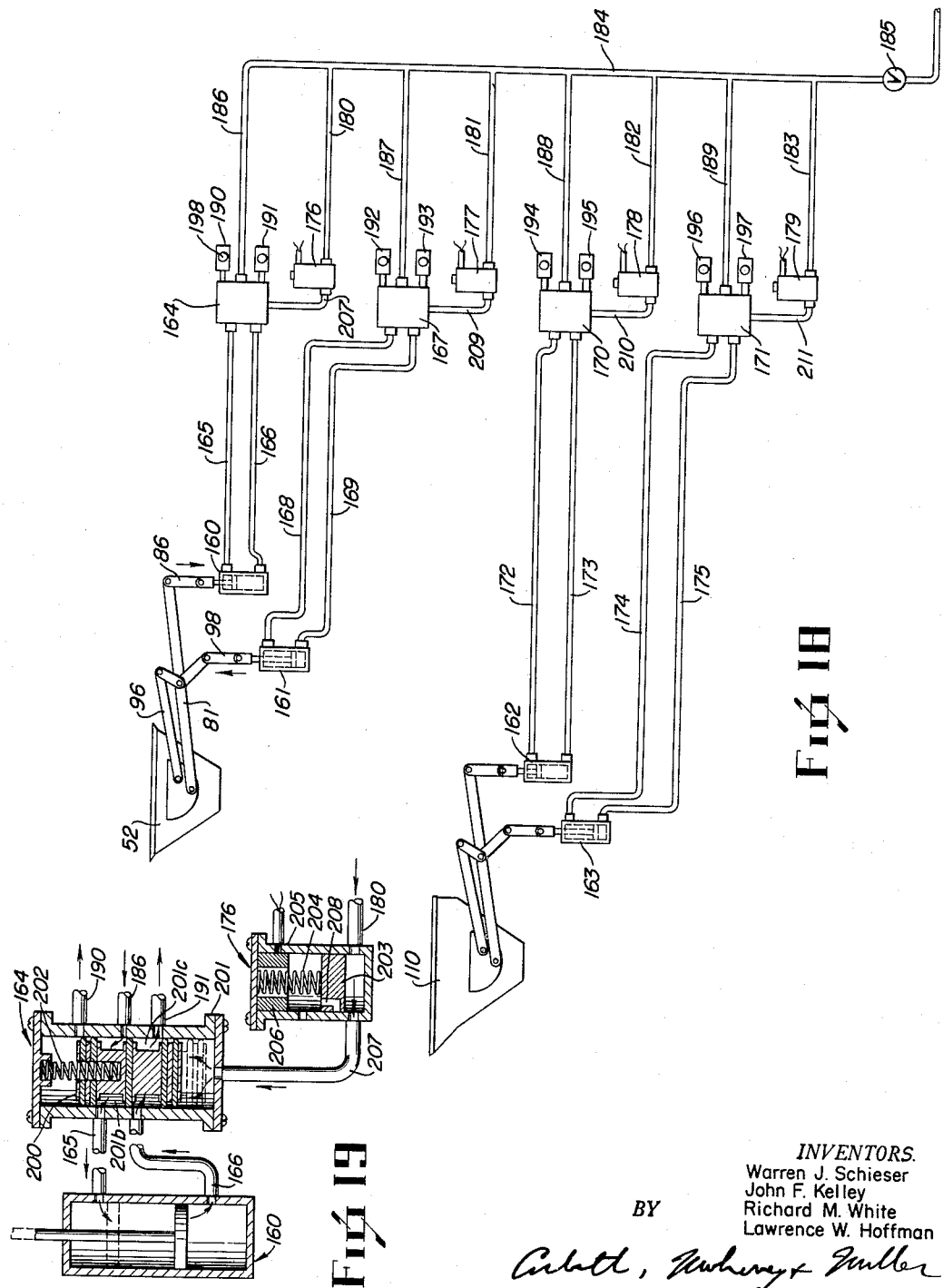

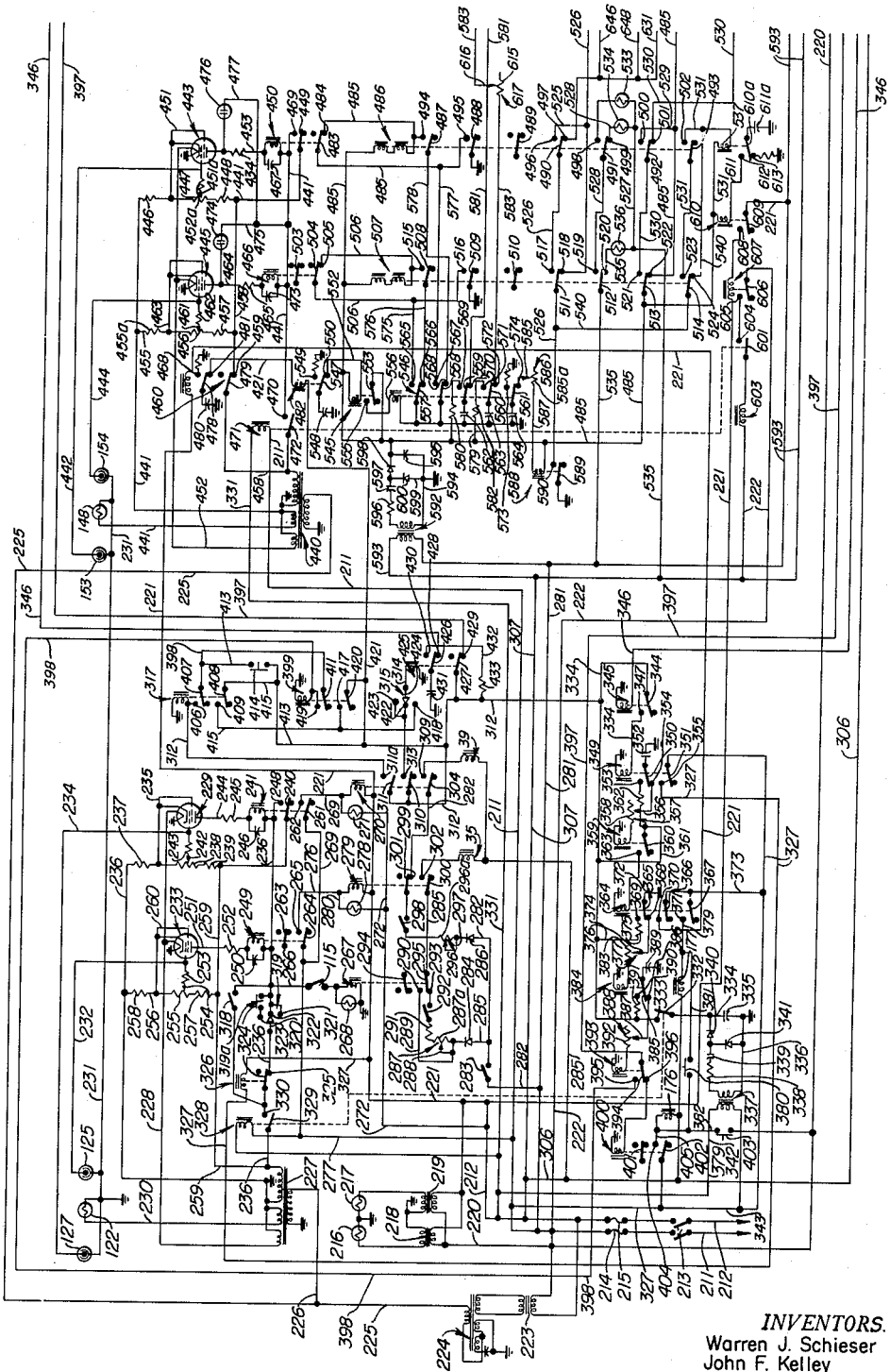

United States Patent Office 2,726,061
Patented Dec. 6, 1955

2,726,061

WEIGHING AND CHECKWEIGHING MACHINE

Warren J. Schieser, John F. Kelley, Richard M. White, and Lawrence W. Hoffman, Columbus, Ohio, assignors to The Exact Weight Scale Company, Columbus, Ohio, a corporation of Ohio Application October 21, 1952, Serial No. 315,906

54 Claims. (Cl. 249—2)

Our invention relates to a weighing and checkweighing machine. It has to do, more specifically, with a weighing and checkweighing machine of the over-and-under weight or even balance type, although various features of our invention are not limited to a machine of that type.

Our scale is especially designed for accurately weighing and checkweighing powder charges which are subsequently loaded into explosive shells, but it is capable of use in weighing and checkweighing other commodities or materials where extreme accuracy is required. The powder for explosive shells is usually in the form of small pellets which are supplied to the shell-loading plant in bulk or loose condition. Our weighing machine is designed to receive these pellets in bulk and feed a predetermined amount of the pellets onto a weighing unit forming a part of our machine, to obtain a charge of predetermined weight; and then to feed the weighed charge on to a checkweighing unit forming a part of our machine, where the charge is checkweighed and is classified as correct-weight, overweight or underweight, and if out of tolerance, is rejected and dumped into a suitable receiver, or if within tolerance is dumped into a receiver for the accurately weighed and checkweighed charge.

One of the objects of our invention is to provide a weighing and checkweighing scale of the general type indicated above which is extremely sensitive and, therefore, extremely accurate.

Another object of our invention is to provide a scale which is not only extremely sensitive and extremely accurate, but which is so designed that the weighing and checkweighing units will be protected from severe shocks ordinarily resulting in prior art machines from the dumping of the weighed and checkweighed charges from such units.

Still another object of our invention is to provide a weighing and checkweighing scale of the general type indicated above, which can be set for completely automatic operation, for semi-automatic operation, or for manual operation by pushbutton, depending upon what type of operation is desired which will, in turn, depend upon circumstances of use of the machine.

Various other objects will be apparent from the following description and the drawings.

The preferred embodiment of our invention is illustrated in the accompanying drawings wherein similar characters of reference designate corresponding parts, and wherein:

Figure 1 is a side elevational view of a weighing and checkweighing machine constructed according to our invention.

Figure 2 is a front elevational view of the machine.

Figure 3 is an enlarged side elevational view showing the weighing unit of the machine, including the weighing bucket and associated dumping mechanism.

Figure 4 is a transverse vertical sectional view taken substantially along line 4—4 of Figure 3.

Figure 5 is a vertical sectional view taken along line 5—5 of Figure 3 illustrating one of the pin and slot mountings for supporting the weighing bucket on the weighing lever in association with the dumping mechanism.

Figure 6 is a plan view, with some parts removed, of the weighing bucket and associated dumping mechanism shown in Figure 3.

Figure 7 is an enlarged transverse vertical sectional view taken substantially along line 7—7 of Figure 6.

Figure 8 is an enlarged transverse vertical sectional view taken substantially along line 8—8 of Figure 6.

Figure 9 is a detail of the connection between the bucket-tilting rod and the bucket.

Figure 10 is a schematic view in side elevation illustrating the weighing bucket and the checkweighing bucket with their respectively associated dumping mechanisms, and indicating how the checkweighing bucket receives the charge from the weighing bucket.

Figure 11 is an enlarged perspective view of the lower end of the feeding chutes which feed the pellets into the weighing and checkweighing buckets.

Figure 12 is a side elevational view illustrating the vibrating units for the main feed chutes.

Figure 13 is a transverse vertical sectional view taken substantially along line 13—13 of Figure 11.

Figure 14 is a detail in plan of the counterweight end of the weighing lever and associated means for controlling the vibrating units of the manual feeding unit of our machine.

Figure 15 is a side elevational view of the structure of Figure 14.

Figure 16 is a transverse vertical sectional view taken along line 16—16 of Figure 15.

Figure 17 is a view like Figure 16 but showing part of the means associated with the checkweighing lever for controlling the weight-classification system of our machine.

Figure 18 is a schematic diagram of the air system of our machine used for controlling lifting and dumping of the weighing and checkweighing buckets of our machine.

Figure 19 is an enlarged schematic view illustrating an associated pilot valve, four-way valve and ram unit controlled thereby, which are part of the system of Figure 18.

Figure 20 is a schematic diagram of a portion of the electric circuit used in controlling the various operations of our machine.

Figure 20A:
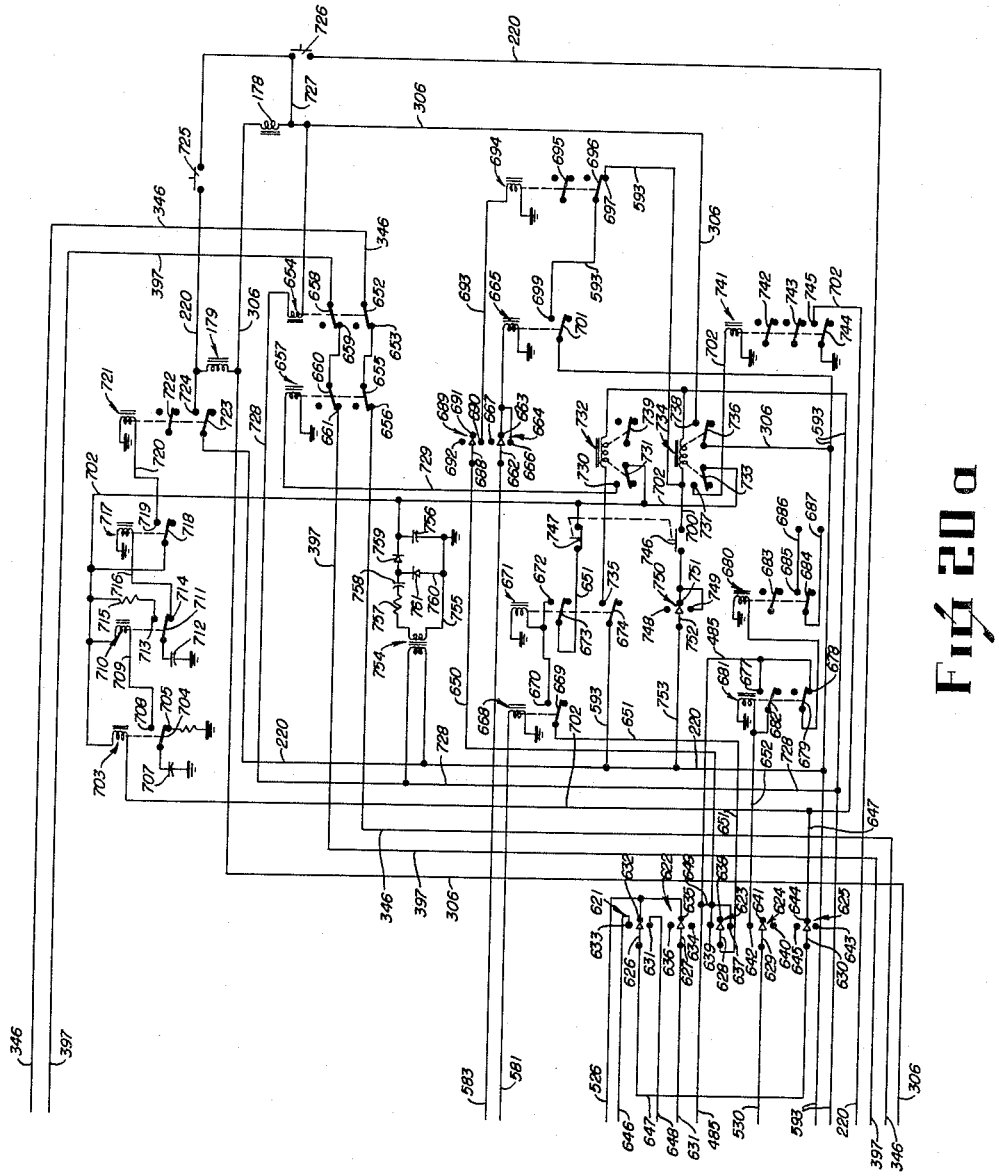
Figure 20a is a schematic diagram of the remaining portion of the electric circuit.

With reference to the drawings, in Figures 1 and 2, we have illustrated the general arrangement of our weighing and checkweighing machine. It comprises several main units which are: the feeding unit 21; the weighing unit 22; and the check-weighing unit 23. The feeding unit 21 is supported at a relatively high level by a frame 24. The units 22 and 23 are supported by an independent frame 25, so that vibration of the feeding unit frame 24 will have no effect on the frame 25 and the weighing units carried thereby. It will be apparent from Figures 1 and 2, that the frames 24 and 25 are of such relative height that the weighing unit 22, which is carried at the upper end of frame 25, is at a slightly lower level than the feeding unit 21. Also, it will be noted that frame 25 is disposed laterally to the right of unit 21 (Figure 2). Thus, weighing unit 22 is slightly lower than and slightly to the right of the feeding unit 21. The checkweighing unit 23, it will be noted, is disposed on the frame 25 at a slightly lower level than and directly below the weighing unit 22. With this arrangement, the pellets to be weighed into a charge will be received in bulk by the feeding unit 21 and will be fed in a predetermined amount to the weighing unit 22; will then be dumped from the weighing unit 22 into the checkweighing unit 23 where the charge will be checked for accurate weight and will be classified exact weight, underweight or overweight, the charge if it is exact weigt, being then dumped into one receiver and the charge if it is overweight or underweight, being dumped into another receiver. The feeding unit 21 and the weighing and checkweighing units 22 and 23 are controlled by suitable controls, to be described hereinafter, so that the feeding, weighing, and checkweighing operations can be completely automatic, semi-automatic, or manual by pushbutton.

The feeding unit 21 comprises an upright hopper 26 which is of funnel shape and is carried by the upstanding extension 27 of the frame 24. The lower end of this hopper 26 extends into the rearward end of the main feed chute 28. Cables 29 are used for movably suspending the hopper 26 between the uprights of the frame extension 27 so that the lower end of the hopper can be swung forwardly or rearwardly relative to the chute 28. A yoke 30 extends transversely of the uprights of the frame extension 27 and is carried thereby, this yoke having an adjustable connecting rod 31 connected thereto, the opposite end of the rod (not shown) being pivotally connected to the rear side of the hopper 26. With this arrangement, the lower end of the hopper 26 may be swung forwardly or rearwardly relative to the chute 28 and will be held in adjusted position.

The main chute 28 of the feeding unit 21 is vibrated by a vibrating unit 35 (Figure 12). This unit 35 may be of the electromagnetic type and, when energized, imparts rapidly occurring vibrations to the chute 28, which may be inclined forwardly and downwardly, as shown, or may be level. The amplitude of vibration may be adjusted so as to provide a controlled positive feed of the pellets through the chute 28.

The vibrating unit 35 and chute 28 are carried on suitable supports 36 and 37, which are carried by the frame 24, the unit being mounted on cushioning springs 38, which dampen the vibrations imparted to the frame 24.

Directly alongside the main feed chute 28, at the lefthand side thereof (Figure 2) is the auxiliary feed or dribble feed chute 40. The relative arrangement of these chutes is also illustrated in Figures 11 and 13. The chute 40 may be level or inclined and is vibrated by an independent vibrating unit 39 like the unit 35. This unit is supported on a horizontal platform 41 which, in turn, is supported by the vertical posts 42 (Figures 1 and 12) on the frame 24. Cushioning springs 43 are provided for absorbing vibration created by the unit 39. The chute 40 extends parallel to and beyond the front portion of the chute 28. It will be noted from Figure 11 that the adjacent wall 44 of the main chute 28 is provided with an opening 45 for the pellets to feed into the chute 40 during vibration of the chute 28. The chute 28 is flat and wide (Figure 13) but chute 40 is of an L shape cross-section with its outer wall 46 inclined upwardly and outwardly, and with its inner wall 47 disposed at a declined angle, and sloped downwardly and outwardly from the lower portion of the chute 28, so that pellets P feeding through the opening 45 of the main chute 28 will roll outwardly towards outer wall 46 of the chute 40. To ensure that the chute 40 will feed only a single line of the pellets P, which are of cylindrical form as shown in Figure 11, in end-to-end relationship in a horizontal plane, an opening 48 is provided in the inner wall 47 of the chute 40 to permit excess pellets P to drop from the chute 40, if there is more than a single line of pellets P being fed up to the opening 48 in the chute 40. The chute 40 is narrowed further into V-formation (Figure 11) at its extreme forward end to positively form the single line of pellets. Any pellets P which drop through the opening 48 will fall onto an apron 49 (Figure 13) which extends from beneath the chute 28, which carries it, laterally beneath the chute 40. As previously indicated, the forward end of the chute 28 is behind the forward end of the chute 40. It will be noted from Figure 11 that the forward end of the apron 49 terminates flush with the forward end of the chute 28 and the opening 48 is located rearwardly of the forward end of the chute 40 so that the pellets P, dropping through the opening 48, will drop onto the apron 49. The adjacent portions of the chute 40 are spaced sufficiently from the chute 28 (Figure 13) so that the two chutes can vibrate independently without interference.

The chutes 28 and 40, as shown in Figures 1, 2, and 11, discharge into separate sections of a directing hopper 50 which is carried by the weighing unit 22. This hopper is rigidly supported by the upstanding brackets 51 (Figures 10 and 11) carried by the weighing unit bucket 52. It will be noted that the directing hopper 50, carried by the weighing bucket 52, is located directly below the chutes 28 and 40. The main section 53 of the hopper 50 is provided with an inclined bottom 54 with which the pellets P will contact when dropping from the chute 28 and apron 49, this arrangement serving to break the fall of the pellets so that the shock therefrom will have less effect on the weighing unit 22 during the weighing operation. The other section 55 of the hopper 50 extends laterally in a horizontal plane so as to receive and retain the pellets P dropping from the chute 40, and at the time of dumping, of the bucket 52, discharge them into the directing chute 52a which is carried by an extension 25a of the frame 25 as shown in Figure 2.

The weighing unit 22 is illustrated best in Figures 1 to 10 inclusive. It is illustrated as being of the even-balance type. It comprises a weighing lever 60, consisting of parallel arms rigidly connected together, which is fulcrumed midway its ends by the knife-edge pivot 61 which rests in the V-bearings 62. The V-bearings 62 are carried on the upright center yoke 63, mounted on the base 25b which in turn is supported on frame 25. The weighing end of the lever 60 carries the commodity outrider 64 which is suspended from the lever 60 by means of the upright arms 65 (Figure 4). The upper ends of these arms 65 carry the inverted V-bearings 66 which rest on the knife-edge pivots 67 which are carried by the commodity end of the lever 60. The opposite end of the weighing lever 60 carries the counterweight outrider 68 through the medium of the inverted V-bearings 69, on the outrider, which rest on the knife-edges 70 carried by the weighing lever 60. The commodity and counterweight outriders 64 and 68 are connected together at their lower ends by a checkrod which is pivoted thereto and part of which is illustrated at 71 in Figure 3.

The weighing lever 60 may be connected to any suitable type of over-and-under indicating mechanism for indicating the position of the lever in the weighing operation. However, we prefer to use that type of indicator known as the "Shadograph" and illustrated in the U. S. patent to Sullivan, No. 2,335,200, issued November 23, 1943, whereby the deflection of the lever is indicated by projecting the image of an index member by a mirror or mirrors to a position in the window 72 at the upper end of the indicating tower 73 which is supported at the righthand upper corner of the frame 25, with the window 72 facing towards the left (Figure 3). However, other indicator arrangements may be provided. The indicating mechanism is controlled by means of an arm 60a which is rigidly attached to the adjacent end of the lever 60 and extends into the tower 73 (Figure 3).

The commodity outrider 64 is adapted to carry the weighing bucket 52 during the weighing operation. This weighing bucket 52 (Figure 4) is disposed between the upright arms 65 of the commodity outrider 64. Rigidly attached to the bottom (Figure 3) of this weighing bucket 52 at the lefthand side thereof is a pair of relative short posts 75 and rigidly attached to the center of the righthand inwardly extending wall thereof is a single longer post 76 (Figure 3). All of these posts have cups formed in their lower ends to mate with upright adjustable pointed pins projecting vertically from the outrider 64, the posts 75 mating with the pins 77 and post 76 mating with the pin 78, it being noted that pins 77 are much shorter than the pin 78. During the weighing operation, the posts 75 and 76 rest on the respective pins 77 and 78. These pins can be relatively adjusted to level the weigh scale bucket 52.

After the weighing operation, the weighing bucket 52 is dumped outwardly, as shown by the dotted lines in Figure 3. During this dumping operation it is desirable to have the bucket 52 supported independently of the lever 60 so that the shocks created during the dumping operation will not be transmitted to the lever 60 and its associated sensitive knife-edges and V-bearings. Also, it is desirable to have the lever 60 free of the weight of the dumping mechanism. Therefore, we provide the arrangement shown in the drawings whereby the weighing bucket 52 is first lifted from the lever 60 and is then dumped.

This lifting mechanism comprises a pair of normally upright semi-circular plates 80 (Figure 3) which are located at opposite sides of the weighing bucket 52 (Figure 4) and are spaced therefrom. These plates 80 are pivotally carried on the lefthand end of a bucket-supporting frame 81 (Figure 6), the plates being pivoted to the frame by pivots 82 which are located at the lower curved edges of the plates 80 (Figure 3) midway between the righthand and lefthand edges thereof. The bucket-supporting frame 81 is pivoted for vertical swinging movement by means of a transverse sleeve 83 (Figures 6 and 8) which is integrally formed with the frame 81 and is supported by a pivot rod 84. The ends of this rod 84 are supported in the upper ends of upright supporting arms 85 on a yoke carried by the weighing unit base 25b. The arms 85 are of such height that the sleeve 83 will be located above the lever 60 at such a level that it will not interfere with the rise and fall of the lever. The frame 81 can be swung vertically by means of a link 86 (Figure 8) which has its upper end pivoted to the right hand end of an arm 87 that is integral with the sleeve 83 of the frame 81.

It will be noted from Figures 4 and 6 that the weighing bucket 52 is provided midway on its opposite sides with the oppositely projecting extensions 88 (Figures 4 and 6) which extend to points adjacent to the plates 80 and which cover the associated outrider bearings for protection thereof. The plates 80 are connected to the extensions 88 by pin and slot connections which permit limited relative movement of the plates and the weighing bucket 52. These connections are shown best in Figures 3, 4, 5, and 6, and comprise the pins 89 (Figure 5) carried by the bucket extensions 88 which extend loosely into the vertical slots 90, formed in the plates 80, it being noted that the slots are enlarged at their upper ends (Figure 3). With the frame 81 in its normal position, the weighing bucket 52 is supported by the upright pins 77 and 78 on the commodity outrider 64, and the pins 89 are spaced from the lower ends of the slots 90, as shown by the full lines in Figure 3. However, if the arm 87 of frame 81 is pulled downwardly by the link 86, the plates 80 will be lifted upwardly by the frame 81 and the lower ends of the slots 90 will engage the pins 89. This will lift the weighing bucket 52 so that its supporting posts 75 and 76 will no longer rest on the respective pins 77 and 78 of the outrider 64. The weighing bucket 62 will thus now be free of support from the lever 60 and can be dumped without having any effect on the lever. To center the bucket 52 relative to the lever 60 when it is lifted free of the lever, the plates 80 are provided with the adjustable set screws 91 which extend inwardly into cooperative relationship with the outer ends of the extensions 88. During the weighing operation, the weighing bucket 52 can move vertically without having the pins 89 thereon contact with either the upper or the lower ends of the slots 90, since the slots are sufficiently long and properly located to prevent this when the lifting frame 81 is in its normal weighing position. Thus, even though the lifting mechanism is not carried by the weighing lever 60, it does not interfere with vertical movement thereof.

The weighing bucket dumping mechanism is illustrated best in Figures 3, 6, 7, 9 and 10. It comprises the adjustable connecting rod units 95 which are disposed above the frame 81 at each side thereof. Each rod unit 95 is pivoted to its respective plate 80 by a pivot 96 located above and to the right (Figure 3) of the frame pivot 82. The opposite end of one of the rod units 95, that is the one at the rear side of the weighing unit 22, is pivoted to the upper end of one arm of a bellcrank lever 97 (Figure 7) which is keyed on the rod 84 outside the frame lifting arm 87 (Figure 6). The opposite end of the other rod unit 95 (Figures 3 and 6) is connected to a simple crank arm 97a which is keyed to the other end of the rod 84. The bellcrank lever 97 is swung about the axis of the rod 84 by means of a vertically movable link 98 pivoted to the other arm thereof. It will be apparent that upward movement of the link 98 will swing the bellcrank lever 97 and the crank arm 97a about the axis of rod 84 and will exert a push on both of the rod units 95. This will cause the plates 80 to tilt to the left (Figure 3), about their supporting pivots 82, dumping the weighing bucket 52, as shown by the dotted lines in Figure 3. It will also be noted that the outer side of the bucket 52 is angled inwardly to facilitate dumping. During dumping, the right hand pin 89 will move into the upper end of its mating slot 90 and the left hand pin 89 will move into the lower end of its mating slot 90. As will be apparent later, the controls of our machine are such that dumping of the weighing bucket 52 will take place only after the bucket has been lifted from the weighing lever 60. To insure that the weighing bucket 52 will be dumped only after it is lifted from the supporting pins 77 and 78, in order to prevent damage to the scale bearings and other parts, the rod units 95 are constructed as shown in Figure 9. Each of these rod units 95 (Figure 9) comprises a compression spring 100 disposed within the sleeve 102 which is pivoted directly to the bellcrank 97 or the crank arm 97a.

The main part 99 of the rod unit 95 extends loosely into the sleeve 102 and is provided with a shoulder 103 (Figure 9) which engages one end of the spring 100. This part of the rod is pivoted directly to the bucket 52 at the point 96. If the weighing bucket 52 is lifted from its supporting pins 77 and 78 and a push is exerted on the rod units 95 by upward movement of link 98, the springs 100 will not be compressed but the weighing bucket 52 will be tilted for dumping. However, if the weighing bucket 52 has not been lifted from its supporting pins 77 and 78 and the link 98 is moved upwardly to push on the rod units 95, the springs 100 will merely be compressed and no damage to the weighing lever 60 and its bearings will result.

The checkweighing unit 23 is practically identical with the weighing unit 22. This is true of the even-balance lever arrangement as well as the mechanism for lifting and dumping the bucket 110 of this unit. The bucket 110, as shown in Figure 2, is disposed to the left of and below the bucket 52 of the weighing unit 22 and, as shown in Figure 1, is disposed in the same vertical plane at the front of the machine. Thus, when the weighing bucket 52 is tilted outwardly to the left, the pellets P weighed therein are dumped into the bucket 110 of the checkweighing unit 23. The chute 52a is in the form of an inwardly directed U-shape guard or baffle and is supported by the frame extension 25a over the normal position of the bucket 110 to aid in guiding the pellets, dumped from the weighing bucket 52, into the checkweighing bucket 110. The checkweighing unit 23 may be provided with any suitable type of indicating mechanism and this may be of the same type as the mechanism associated with weighing unit 22, or may be of a different type. This indicating mechanism is preferably disposed in the housing 112 (Figure 2) that is carried by the frame 25 in association with the checkweighing unit 23. This housing 112 has a window 113 in which a shadow indicator preferably travels across a visible dial. The window 113 preferably faces towards the front of the machine so that it is easily visible to an operator. The indicating mechanism associated with the lever 111 of the checkweighing unit 23 may be connected to any suitable type of over-and-under indicating mechanism for indicating the position of the lever in the checkweighing operation. However, we prefer to use that type indicator known as the "Shadograph" as previously described.

In Figures 14 to 16, we have illustrated means associated with the weighing lever 60 for controlling vibration of the feeding chutes 28 and 40 of the feeding unit 21. This means is adapted to cause a fast feed, then a medium feed, and finally a slow or dribble feed. The fast feed is controlled by means of a microswitch 115 supported by the weighing unit base 25b adjacent the weighing lever 60. This switch 115 (Figure 15) is supported below the counterweight end of the lever 60 and is so operated by this end of the lever that when the lever is in underweight position, the switch is closed and the circuit to the vibrating unit 35 for the chute 28 is completed, causing fast vibration of the chute 28. This fast-feed circuit will be described later. The switch 115 is directly actuated by an adjustable setscrew 116, the lower end of which engages, at the proper time, the pushbutton 115a of the switch 115. The screw 116 is carried by a bracket 117 which is supported by the extension 60a of the lever 60 in such a position that the lower end of the screw will engage the button 115a of the switch 115. As soon as the commodity end of the lever 60 starts its downward movement towards balanced position and the counterweight end moves up, the screw 116 moves away from the switch button 115a allowing the switch to open and break the fast-feed circuit. The position of setscrew 116 in bracket 117 can be adjusted to increase or decrease the feed time of the fast-feed circuit. Thus, the fast feed occurs for the desired time at the beginning of the weighing operation.

The medium feed is also controlled by the position of the weighing lever 60 and by a circuit to the vibrating unit 35 which vibrates the main chute 28. However, in this instance, a photoelectric cell unit 120 is used as part of the control means for the circuit. This unit 120 is supported at the counterweight end of the lever 60 by the base 25b through the medium of a vertically disposed plate 121 attached thereto and disposed transversely of lever extension 60a and spaced from the extremity thereof.

This plate 121 carries a light source 122 midway of the front and rear edges thereof. On the plate 121 in front of the light source 122, is a photocell 125 enclosed within a glass dust cover 123. Behind the light source 122, on the plate 121, is another photocell 127 which is enclosed within a glass dust cover 126. The photocell 125 is adapted to control the medium feed by controlling the circuit to the vibrating unit 35 for the main chute 28. The photocell 127 is adapted to control the slow or dribble feed by controlling the circuit to the vibrating unit 39 which vibrates the dribble feed chute 40. These photocell feed control circuits will be described later. The extension 60a of the counterweight end of the weighing lever 60 carries a pair of bracket arms 128 and 129 at the front and rear sides thereof which are pivoted for vertical swinging movement about a transverse pivot 130 on the extension 60a. The arms 128 and 129 extend parallel with the extension 60a and carry the flag-supporting arms 131 and 132, respectively, which are rigidly connected therewith and which extend outwardly beyond the end of member 60a. These arms 131 and 132 move vertically within slots in the housing of the unit 120. The arms 131 and 132 carry, respectively, the light-interrupting flags 133 and 134 which depend therefrom. The flag 133 will be movable within the extension 60a of the lever 60 vertically between the light source 122 and the photocell 125. The flag 134 will be movable vertically between the light source 122 and the photocell 127. The flag 133 is of less depth than the flag 134 or, in other words, the flag 134 will depend more from the end of the lever extension 60a than the flag 133. With this arrangement, both of the photocells 125 and 127 will be blanked when the lever 60 is in underweight position since the flags 133 and 134 will be in their lower positions, thereby completing the medium and dribble feed circuits to the vibrating unit 35 for the chute 28 and to the vibrating unit 39 for the chute 40. At this time, the switch 115 is closed and the fast-feed circuit to the vibrating unit 35 for the chute 28 is completed, as the lever 60 starts to move towards balanced position, the switch 115 opens, breaking the fast-feed circuit to the vibrating unit 35. At this time, the flag 133 is still in position to blank the photocell 125 and maintain the medium-feed circuit to the vibrating unit 35. Continued vertical movement of the counterweight end of the lever 60, moves the flag 133 to such a position that light from the source 122 reaches the cell 125 and at this time, the medium-feed circuit will be broken. However, the dribble or slow-feed circuit will still be maintained because the flag 134 will still blank the cell 127. Further upward movement of the lever 60 into balanced position, as shown in Figure 16, will move the flag 134 to such a position that light will reach the cell 127 which will break the slow-feed circuit to the vibrating unit 39. Thus, in the movement of the lever 60 from underweight position to balanced position, the feeding unit 21 is controlled so that first there is a fast feed by the chute 28, then a medium feed by the chute 28, and finally, a slow or dribble feed by the chute 40. Each of the bracket arms 128 and 129 is provided with an adjusting screw 128a connected to the arm and the extension 60a for pivoting each arm independently about the pivot 130 to adjust the vertical position of each of the flags 133 and 134. To aid in starting the lever 60 towards balanced position from an underweight position, a flex 135 (Figure 15) is provided on the bracket 136 which is supported on the base 25b so that when the lever 60 moves into underweight position, an adjustable screw 137, carried by the lever extension 60a, will engage the flex 135. Adjustment of screw 137 will vary the returning force exerted by the flex 135.

In Figure 17, we have illustrated means in association with the checkweighing lever 111 for controlling the classification circuits which will classify the weighed charge as it is checkweighed as being within tolerance, underweight, or overweight. This means is practically identical with the photocell and flag arrangement at the end of the weighing lever 60 and is associated with an extension of the counterweight end of the lever 111. It includes the flag-carrying arms 140 and 141 (Figure 17) which carry the light-interrupting flags 145 and 146 which are associated with the photocell unit 142. The unit 142 includes the light source 148, the classification photocell 153, and the classification photocell 154, both of these cells being affected by the light source 148. The flag 145 moves vertically between the light source 148 and the photocell 153 and the flag 146 moves vertically between the light source and the cell 154. The flag 145 depends more than the flag 146. These flags are vertically adjustable in the same manner as the flags 133 and 134. With the lever 111 in underweight position, the flags 145 and 146 will be in their lowermost positions and both the cells 153 and 154 will be blanked. As will later appear, this will control the classification circuits so that the charge in the checkweighing bucket 110 will be classified underweight. If the lever 111 moves into balanced position, the flags 145 and 146 will be in the positions shown in Figure 17 and the cell 154 will be illuminated while the cell 153 will still be blanked. This will cause the classification circuits to classify the charge correct weight. If the lever 111 moves into overweight position, the flag 145 will be at such a height that photocell 153 will be illuminated along with photocell 154.

This will cause the classification circuits to classify the charge overweight.

In Figure 18, we have illustrated schematically the air system for controlling lifting and dumping of the weighing bucket 52 and the checkweighing bucket 110. As shown in this figure, a cylinder and piston or ram unit 160 is used for controlling vertical movement of the link 86, which, in turn, controls vertical movement of the lifting frame 81 for the weighing bucket 52. Similarly, a cylinder and piston or ram unit 161 is provided for controlling vertical movement of the link 98 which, in turn, controls the connecting rods 96 that control tilting of the weighing bucket 52. For controlling lifting of the check-weighing bucket 110, there is provided the cylinder and piston or ram unit 162, and for controlling dumping of the bucket 110, there is provided a cylinder and piston or ram unit 163.

The air supply to the cylinder 160 is controlled by a pilot-operated four-way valve 164 which is connected to the cylinder of unit 160 by means of the upper line 165, and the lower line 166. The cylinder and piston unit 161 is controlled by the pilot-operated four-way valve 167 which is connected thereto by means of the upper line 168 and the lower line 169. The pistons 162 and 163 of the checkweighing unit are controlled in the same manner by pilot valves 170 and 171, the valve 170 being connected to the unit 162 by the upper line 172 and the lower line 173 and the valve 171 being connected to the unit 163 by the upper line 174 and lower line 175. The four-way valves 164, 167, 170 and 171 are controlled by the solenoid-actuated pilot valves 176, 177, 178 and 179, respectively, which are actuated at the proper instants by the electric circuit to be described later. The solenoid valves 176, 177, 178 and 179 are connected by the respective lines 180, 181, 182, and 183 to the main air supply line 184 which is connected to a suitable source of filtered and regulated air and is under the control of a main valve 185 which is manually operable. The four-way valves 164, 167, 170 and 171 are connected by the respective lines 186, 187, 188 and 189 to the main supply line 184. The valve 164 is provided with a pair of throttle valve fittings 190 and 191, the valve 167 is provided with a pair of throttle valve fittings 192 and 193, the valve 170 is provided with a pair of throttle valve fittings 194 and 195, and the valve 171 is provided with a pair of throttle valve fittings 196 and 197. Each of these fittings is provided with a needle valve which, in the usual manner, is under the control of a screw 198 (Figure 18) to variably adjust the size of the exhaust opening thereof.

The particular structure of each four-way valve and each solenoid pilot-valve is shown by the example given in Figure 19. This figure shows the four-way valve, the associated pilot valve 176, and the ram unit 160 which they control. The four-way valve 164 is of the spool type and comprises the vertically movable spool 200 which is slidably mounted in the housing 201, and which has the annular passageways 201b and 201c formed therein. The spool 200 is normally kept in its lowermost position by means of a compression spring 202 disposed between its upper end and the upper end of the housing 201. In this lower position, indicated by dotted lines in Figure 19, which is its normal position, the piston of unit 160 will be in its upper position as indicated by dotted lines. At this time the spool 200 will expose the line 165 and will connect it to the vent line connected to the throttle valve 190 so that air can exhaust from the upper end of the cylinder. Also at this time the air supply line 186 is connected to the line 166 through the passageway 201c, thereby supplying pressure to the lower end of the cylinder of unit 160 to maintain the piston thereof in its upper position and the weighing bucket lifting frame 81 in its lower position so that, at this time, the bucket 52 is supported on the lever 60. The solenoid-actuated pilot valve 176 is normally closed, so that valve 164 is in the position described above, but when energized will be opened. It comprises a valve piston 203 which is normally held in its lower position by means of a spring 204 but which is movable upwardly in housing 205 when the solenoid coil 206 is energized. In its lower position, the piston 203 disconnects the air supply line 180 from the line 207, which is connected to the lower end of the four-way valve 164, but connects the line 207 to the vent 208 formed in the valve piston 203. It will be apparent that when the solenoid coil 206 is energized, the vent 208 is closed, air is supplied to the valve 164 from the line 180, through the valve 176 and through the line 207, so as to lift the spool 200 of the valve 164 against the force of the spring 202. This, as shown in full lines in Figure 19, will connect the air supply line 186 to the line 165 through the passageway 201b, and supply pressure to the upper side of the cylinder of unit 160 thereby moving its piston downwardly and lifting the frame 81 and the bucket 52 from the weighing lever 60, and will allow the air to exhaust from the lower end of the cylinder of the unit 160, through the line 166, which will now be connected to the line of the throttle valve 191 through the passageway 201c. As soon as the solenoid 206 is de-energized, the spring 204 of the valve 176 will move the piston 203 to its lowermost position, disconnecting the line 180 from the line 207, connecting the line 207 to the vent 208 of the valve 176, and thereby permitting the spool 200 of valve 164 to return to its original position.

The other pilot valves 177, 178, and 179 are identical with that described and are connected to the respectively associated four-way valves 169, 170 and 171 by the air lines 209, 210 and 211, respectively. Normally, the pistons of the units 160 and 162 are in their uppermost positions while those of the units 161 and 163 are in their lowermost positions, as shown in Figure 18. The four-way valve 170 for controlling the ram unit 162 is identical with the valve 164. The other two valves 167 and 171 are identical except that the passageways therein are arranged to supply air pressure to the lower sides of the respective ram units 161 and 163 when the associated pilot valves 177 and 179 are energized.

Thus, it is apparent that when solenoid valve 176 is energized, the bucket 52 is lifted. The speed at which the bucket is raised can be varied by adjusting the screw 198 of throttle valve 191. The speed at which the bucket is lowered onto the lever 60 can be varied by a similar adjustment of the throttle valve 190. Each time the solenoid valve 177 is energized, the bucket 52 will be tilted into dumping position. The speed at which it is tilted can be varied by adjustment of throttle valve 193. The speed at which it is returned can be varied by adjustment of throttle valve 192. The checkweighing bucket 110 will be lifted by operation of the solenoid valve 178, the speed of lifting of this bucket being controlled by adjustment of the throttle valve 195 and the return movement being controlled by adjustment of the throttle valve 194. Tilting of the checkweighing bucket 110 occurs when the solenoid valve 179 is energized, the speed of tilting being controlled by adjustment of the throttle valve 197 and its return movement being controlled by adjustment of the throttle valve 196.

The electric circuit for controlling the various units of our machine is illustrated in Figures 20 and 20a. With reference to Figure 20, the main input lines 211 and 212 lead from a suitable source of power, preferably 110 volt, 60 cycle. These lines are controlled by the line switch 213. The lines 211 and 212 are provided with the usual fuses, 214 and 215. The dial light 216 for the indicating mechanism of the weighing unit 22, and the dial light 217, for the indicating mechanism of the checkweighing unit 23, are provided and current of proper voltage is supplied thereto by means of the respective power transformers 218 and 219 the primaries of which are connected in parallel with the lines 211 and 212 by the lines 220 and 222, and 220 and 221, respectively. Also, connected in parallel with the lines 211 and 212 by means of the line 222 is the primary of an isolation transformer 223, and associated with this transformer 223 is a voltage-regulating transformer 224. This transformer 224 is of such a type that it supplies 115 volt alternating current isolated and regulated voltage to all the amplifiers for the photocells 125, 127, 153 and 154. Any variations in the line voltage will not affect operation of these photocell amplifiers. The line 225 leading from the secondary side of the transformer 224 is connected to a line 226 which, in turn, is connected to the primary of a power transformer 227. The first of the secondaries of this transformer 227 is connected by a line 228 to the heaters of the thyratron tubes 229 and 233 which amplify the current from the photocells 127 and 129 and control the lifting and tilting circuits for the weighing bucket 52. The next of the secondaries of the transformer 227 is connected by a supply line 230 to one side of the light source 122 which is grounded at its other side. This light source, as previously indicated, is associated with the counterweight end of the weighing lever 60 and controls the photocell 125 which, in turn, controls hte medium feed of unit 21 and controls the photocell 127 which, in turn, controls the dribble feed of such unit. The cathodes of photocells 125 and 127 are connected to a line 231. The line 231 is connected to ground through the line 230. The anode of the cell 125 is connected by a line 232 to one of the grids of the thyratron tube 233. The anode of the cell 127 is connected by a line 234 to one of the grids of the thyratron tube 229. The other grid of this tube 229 is connected to the line 235, which also connects to the cathode of this tube and to a line 236 which is connected to all of the secondaries of the transformer 227 which is connected to ground. The line 236 has the resistances 237, 238 and 239 therein and is connected to one of the movable contact arms 240 of a relay 241 which is controlled by the thyratron tube 229. The resistance 238 in the line 236 cooperates with an adjustable contact 242 which is connected to a resistance 243 and to the line 234, and also to the first-mentioned grid of the thyratron 229. The potentiometer formed by the contact 242 and the resistance 238 provides voltage adjustment means for varying the grid bias on the tube 229. The plate of tube 229 is connected by a line 244, which has the resistance 245 therein, to the coil of the relay 241 and to a condenser 246 associated therewith, these components being also connected to the line 236 which connects with a fixed contact point 248, associated with the movable contact 240 of the relay 241. The line 236 also connects with the coil of the relay 249 which is controlled by the thyratron 233, and with the condenser 250 associated therewith, these components being connected by the line 251, which has a resistance 252 therein, to the plate of the tube 233. Connected to the line 232 and to the first-mentioned grid of tube 233 is a resistance 253 and the movable contact 254 of a potentiometer which controls the grid bias on the tube 233. This potentiometer includes the resistance 255, with which the movable contact 254 cooperates, and which is in line 256 along with the associated resistances 257 and 258. The line 256 shunts the line 236, which is connected to one side of all of the secondaries of the transformer 227, as previously indicated, and the line 259, which is connected to the other side of the last secondary of this transformer and is also connected to the line 236 as indicated. The other grid of this thyratron 233 is connected to the line 260 which also connects to the cathode of this tube and to the line 256.

As indicated previously, the thyratron 229 controls the relay 241 and the thyratron 233 controls the relay 249. These relays control the feeding unit 21, the relay 249 controlling the medium feed and the relay 241 controlling the slow feed thereof. The thyratron 233 controls the medium feed relay 249 and, in turn, is controlled by the medium feed photocell 125. The thyratron 229 controls the slow feed relay 241, and, in turn, is controlled by the slow feed photocell 127. The relay 241 includes the movable contact arm and associated contact point 248, previously mentioned, and the movable contact arm 261 and the associated contact point 262. The arms 240 and 261 are ganged together and with the coil of the relay 241 normally deenergized, the arms 240 and 261 are spaced from the respective contact points 248 and 262. The relay 249 includes the movable arms 263 and 264, the arms 263 serving no purpose, but the arm 264 being associated with the contact point 265 from which it is spaced with the relay coil normally deenergized. The line 236 which leads from the contact point 248, is also connected to a line 266. This line 266 has the microswitch 115 connected in series therein, this switch being actuated by the weighing lever 60 of the unit 22 for fast-feed control of the feeding unit 21, as previously indicated. The line 266 is connected to one side of the coil of a fast-feed relay 267, which is grounded at its other side, and is also connected in parallel with a fast-feed indicating light 268. The contact point 262 of the relay 241 is connected by the line 269 to the coil of a slow-feed relay 270 and is also connected in parallel with a slow-feed indicating light 271 by a line 272. The line 269 connects to the line 221 which connects to the main line 212, and the line 272 connects to the power line 211. The arm 261 of the relay 241 is connected to the line 269 which connects to the line 276 that is connected to the arm 264 of the relay 249 and to a line 277 that connects to the power line 211. The contact point 265 of the relay 249 is connected in the line 276 which has the coil of a medium-feed relay 179 connected therein and is connected to the line 221 and which is also connected to a line 280 that has a medium-feed indicating light 278 connected therein, the line 280 also connecting to the line 272.

A line 281 leads from the power line 211 and connects with a line 282 which has a main feeder switch 283 connected therein, in series. The line 282 connects to a rectifier 284 through a line 285 and to a rectifier 286 directly. The rectifier 284 supplies direct current to a rheostat 287 which includes a resistance 287a, connected in the line 285, and a movable contact 288 connected to a line 289 that connects with the contact point 290 of the relay 267 and with the line 285. The rheostat 287 is by-passed by the line 289 when the relay 267 is energized, thus connecting the fixed contact point 290 to the movable arm 295 of the relay 267. The line 285 is provided with another resistance 291, which is associated with the medium-feed test switch 292, connected therein, the line 285 also connecting to the contact point 293 of the relay 267. The relay 267 is provided with the ganged arms 294 and 295, the arm 294 serving no function and the arm 295 moving between the points 290 and 293, and being in contact with point 293 with the coil of the relay 267 normally deenergized. The rectifier 286 supplies direct current to a rheostat 296 which includes a resistance 296a, connected in the line 282, and a movable contact 297 associated with the resistance and connected to the line 282. The line 282 also has connected therein the slow-feed test switch 298 and is connected to the movable contact arm 299 of the relay 279. The relay 279 also includes the movable contact arm 300, the arms 299 and 300 being ganged together and being associated with the respective contact points 301 and 302, the arm 299 engaging the point 301 and the arm 300 being spaced from the point 302 with the coil of the relay 279 normally deenergized. The contact point 301 is connected by the line 282 to the movable contact arm 304 of the relay 270. The contact point 302 is connected in the line 285 which has the coil of the main chute vibrating unit 35 connected therein, the line 285 also connecting to the main line 212 through the lines 306 and 307. The line 285 also connects to the line 282 and this line 282 has connected therein the coil of the dribble feed chute vibrating unit 39, this line also including the contact point 309 which is associated with the movable contact arm 304 of the relay 270. The relay 270 also includes the movable contact arms 310 and 311 which are ganged together with the arm 304. The arms 310 and 311 are connected to the line 312. The arm 311 is associated with the contact point 311a and the arm 310 is associated with the contact point 313. With the coil of the relay 270 normally deenergized, the arm 311 is spaced from the point 311a, the arm 310 is spaced from the point 313, and the arm 304 is spaced from the point 309. The point 313 is connected to a line 314, which leads to a selector switch deck 315. The point 311a is connected in the line 312 which leads to one side of the coil of a relay 317, the other side of the coil being connected to ground. The purpose of the switch deck 315 and of the relay 317 will be discussed later.

The line 266, which includes the microswitch 115, has a fill-test switch 318 connected therein. The line 266 crosses the line 236 and is connected thereto at that point and its end is also connected to the line 236. Connected in the line 236 parallel with the switch 318 is the filler control deck 319 of the selector switch. This switch deck includes the movable contact selector arm 320 which is adapted to selectively engage the contact points 321, 322 and 323, for semi-automatic, automatic, or manual operation of the feeding unit 21. Connected to the point 323 and to the line 236 in parallel with switch 318 is the manual-fill push-button switch 319a for manually controlling filling of the bucket 52 of the weighing unit 22. The points 321 and 322 are separately connected to the line 236. Also connected in the line 236 is the movable contact arm 324 and the associated contact point 325 of the time-delay relay 326, the arm 324 engaging the point 325 with the coil of the relay 326 normally deenergized. The line 236 also connects to the line 259 leading from the transformer 227. The coil of the relay 326 is connected in the line 327 which connects at one end with the power line 221.

As will be explained more in detail later, the microswitch 115 controls the fast-feed relay 267 which, in turn, controls the supply of unregulated and unfiltered direct current from the rectifier 284 to the vibrating unit 35. The medium-feed relay 279 is controlled by the relay 249 and controls the supply of regulated direct current from the rectifier 284, through the rheostat 287, to the vibrating unit 35. Rheostat 287 can be adjusted to vary the intensity of vibration of the unit 35 for the medium feed. The slow-feed relay 270 is controlled by the relay 241 and controls the supply of regulated direct current from the rectifier 286 through the rheostat 296, to the vibrating unit 39. The rheostat 296 can be adjusted to vary the intensity of vibration of the unit 39 for the slow feed. The normally-closed main feed switch 283 is manually operated and is in the common line of the circuits for all three feeds, fast, medium and slow, and is used for testing and for emergency stop. The switch 292 is manually operated for medium-feed testing, and the switch 298 is manually operated for slow-feed testing. The selector switch deck 319 can be set for automatic, semi-automatic or manual operation of the feeding unit 21, and when set for manual operation, the pushbutton switch 324 can be manually operated. The time-delay relay 326 controls the circuit to the selector switch deck 319 and thereby to the fast-feed microswitch 115, and in conjunction with the respective thyratron tubes 233 and 229, to the medium-feed relay 249 and the slow-feed relay 241.

Another time-delay relay 328 is provided so that when the circuit is first energized by means of the main line switch 213, the voltage is prevented from being applied to the circuits for controlling lifting and tilting of the weighing bucket 52, until the thyratron tubes 233 and 229 have reached a stable operating temperature. This relay 328 includes a movable contact arm 329, connected in the line 236 in association with a contact point 330, the arm being spaced from the point with the coil of the relay 328 normally deenergized. The coil of the relay 328 is connected in the line 277, which is connected directly to the main line 211 and to the main line 212 through the line 331. The relay 328 also includes the movable contact arm 332 which is ganged with the arm 329 thereof. The arm 332 and an associated contact point 333 are connected in a line 334 which is connected to ground, the arm 332 being spaced from the contact point 333 with the coil of the relay 328 deenergized. Also, connected in the line 334 is a condenser 335 and on opposite sides of this condenser a line 336 is connected to the line 334. This line 336 has connected in it the secondary of an isolation transformer 337, a resistance 338, a condenser 339, and a rectifier 340. Across the line 336 is connected another rectifier 341. The primary of the transformer 337 is connected in a line 342 which is connected to the power lines 211 and 212 through the respective lines 343 and 331. The transformer 337 supplies isolated 110 volt alternating current and the rectifiers 340 and 341 are arranged in such a manner that the input voltage is rectified and then doubled. The line 334 also connects with the movable contact arm 344 of a relay 345. The coil of this relay has one side grounded and is energized and deenergized through the line 346, by means to be described later, and when deenergized, the arm 344 is spaced from the associated contact point 347. This point is connected in the line 334 to which the coil of a relay 349 is connected, its other side being grounded. The relay 349 includes the ganged movable contact arms 350 and 351. The arm 350 is connected to one side of a condenser 352, the other side being grounded. The arm 350 moves between the two contact points 353 and 354, being in contact with the point 354 with the coil of the relay 349 normally deenergized. The arm 351 is connected in the power line 327 and is normally spaced from a contact point 355, with which it is associated, with the coil of the relay 349 normally deenergized. The point 355 is connected in the line 327 which is connected to the coil of the time-delay relay 326. The contact point 354 is connected to a movable contact arm 356 of a rheostat 357 which also includes the resistance 358. The resistance 358 is connected to one side of a coil of a relay 359, the other side of the coil being grounded. This relay 359 includes the movable contact arm 360 which is connected to a line 361 that is connected to the contact point 353 of the relay 349 and has a resistance 362 therein. The line 361 is connected to the line 334. The relay 359 includes a contact point 363 from which the associated arm 360 is spaced with the coil of the relay 359 normally deenergized. The contact point 363 is connected to one side of the coil of a relay 364, the other side of the coil being connected to ground. This relay 364 includes the ganged movable contact arms 365, 366, and 367. The arm 365 moves between the contact points 368 and 369, being in contact with point 368 with the coil of the relay 364 normally deenergized. The arm 366 is associated with a contact point 370 and the arm 367 is associated with a contact point 371, these arms being out of contact with their respective points with the relay 364 normally deenergized. The arm 365 is connected to one side of a condenser 372, the other side of the condenser being connected to ground. The arms 366 and 367 are connected by the line 373 to the power line 327. The contact point 369 is connected to the line 334 by a line 374 which includes a resistance 375. The contact point 368 is connected to the movable arm 376 of a potentiometer 377. The contact point 370 is connected to the line 221. The contact point 371 is connected to a line 379 which has the coil of the solenoid of the pilot valve 177, connected therein, the valve, as previously indicated, being provided for controlling the dumping or tilting of the weighing bucket 52 of the unit 22. The line 379 also connects to the power line 306. Connected parallel with the solenoid of the valve 177 is a pushbutton switch 380 which is in a line 381 that connects with the line 379 and with a line 382 on opposite sides of the switch. The potentiometer 377 includes a resistance 383 which is connected to the one side of the coil of a relay 384, the other side of the coil being grounded. This relay 384 also includes the movable contact arm 385 which normally engages the associated contact point 386 with the coil of the relay deenergized. The point 386 is connected to the movable contact arm 387 of the potentiometer 388. The arm 385 of the relay 384 is connected to a condenser 389 which has its other side grounded. Another contact point 390 is associated with the arm 385, the arm being disposed for movement between this point and the point 386. This point 390 is connected to the line 334 through the resistance 391. The potentiometer 388 also includes the resistance 392 which is connected to one side of a coil of the relay 393, the other side of this coil being grounded. This relay includes the movable contact arm 394 which moves between the contact points 395 and 396, being in contact with the point 396 with the coil of the relay 393 normally deenergized. The arm 394 is connected to a line 397. The contact point 395 is connected to a line 398 which leads to the coil of the relay 399, the other side of the coil being grounded. The contact point 396 is connected to the coil of a relay 400, the other side of the coil being grounded. The relay 400 includes the ganged contact arms 401 and 402, the arm 401 serving no function. The arm 402 is connected to the power line 343 and is associated with a contact point 404, from which it is spaced with the coil of the relay 400 normally deenergized. The point 404 is connected in the line 405, which is connected to the line 382, and in which the solenoid coil of the pilot valve 176 is connected, this line 405 also connecting to the line 379. As previously described, the valve 176 controls the lifting of the weigh scale bucket 52 preparatory to dumping it. The line 382 has the pushbutton switch 403 connected therein and which is adapted to be actuated manually to lift the weighing bucket 52.

The slow-feed relay 270 controls the application of voltage to the coil of the relay 317, which has one side grounded, through the line 312 previously mentioned. The relay 317 includes a contact point 406 which is connected to the line 312 and which is associated with a movable arm 407 of the relay. This arm 407 is ganged with another movable contact arm 408 of the relay which is associated with a contact point 409. With the coil of relay 317 normally deenergized, the arms 407 and 408 are spaced from the respective contact points 406 and 409. The arm 407 is connected to the line 398 which includes a movable contact arm 411 of the relay 399. Connected to the line 398 is a line 413 in which a pushbutton switch 414 is provided for manual dumping of the weighing bucket 52. This line 413 connects to the line 312 running from the relay 270 to the line 334. The relay arm 408 is connected to the line 413 by a line 415. The contact point 409 of the relay 317 is connected in the line 415 which is connected to a contact point 417 of the relay 399 and to a contact point 418 of the weighing-bucket dumping deck 315 of the selector switch. The coil of the relay 399, which has one side grounded, is connected at its other side to the line 398 as previously mentioned. This relay also includes the contact point 419 and the contact arm 420. The arms 411 and 420 are ganged together, the arm 411 being associated with the contact point 419 and the arm 420 being associated with the contact point 417 but being normally spaced therefrom with the coil of the relay 399 deenergized. The arm 420 is connected to a line 421, which is connected to the line 413, and the point 419 is connected to the line 398. The dumping-deck 315 of the selector switch includes the manual-setting contact point 418, previously mentioned, the automatic-setting contact point 422, and the semi-automatic setting contact point 423. Cooperating with these points is the movable contact or selector arm 424. The points 422 and 423 are separately connected to the line 314 which leads to the contact point 313 of the slow-feed relay 270. The arm 424 is connected to one side of the coil of the relay 425, the other side of the coil being connected to ground. This relay includes the ganged movable contact arms 426 and 427 which are in contact with the respective points 428 and 429 with the coil of the relay 425 normally deenergized. The arm 426 moves between the contact point 428 and another contact point 430 from which it is normally spaced. The arm 426 is connected to one side of a grounded condenser 431 while the arm 427 is connected to the line 312 which leads from the slow-feed relay 270 to the line 334. The contact point 430 is also connected to the line 312 by a line 432 which includes a resistance 433. The point 428 is connected to the line 346 and the point 429 is connected to the line 397.

As will be explained more in detail later, the slow-feed relay 270 controls energization of the relay 425 when the selector switch deck 315 is set for automatic or semi-automatic operation. Also, the relay 270 controls energization of the relay 317 and this relay is locked in the circuit at the proper time through the relay 399. The relay 399 is energized and locked in the circuit at the proper time through the relays 393. The relay 425 controls energization of the relay 345, in a manner which will be explained later, through the line 346. The relay 400 is controlled by the relay 425 to operate the raise-valve 176, through the line 435, connected to relay 425, and eventually through the relay 393 in a manner to be described later. The relay 393, when energized, will prevent operation of the valve 176 by the relay 400 and the time during which the valve is held inoperative can be adjusted by potentiometer 388. The switch 403 can be used at any time to manually control the valve 176. The relay 345 also controls energization of the relay 349. This relay 349 controls energization of the relay 359, which, in turn, controls energization of the relay 364. This relay 364 controls the dump-valve 177 for the weighing bucket 52. The time during which the weighing bucket 52 is tilted outwardly can be adjusted by means of the potentiometer 357. The switch 414 can be actuated to manually dump the weighing bucket 52 when the selector switch deck 315 is set at manual position. The switch 380 can be actuated at any time that switch 403 is closed to dump the weighing bucket 52. The relay 364 also controls energization of the relay 384 and this relay, in turn, controls energization of the relay 393. The time during which the bucket 52 is raised can be varied by adjustment of the potentiometer 377.

In the description of the electric circuit to this point, we have referred mainly to the various circuits for operating the feeding unit 21 and the weighing unit 22. We will now describe the circuits which control the checkweighing unit 23. These circuits include circuits for controlling the classification of the powder charge being checkweighed as correct weight, underweight and overweight, and circuits for controlling the raising and dumping of the checkweighing bucket 110 when the charge is correct weight and when it is out of tolerance.

The light source 148 associated with the checkweighing lever 111 receives its power from a power transformer 440, it being connected in a line 441 which is connected to one side of a secondary winding of the transformer and to the line 231 which is connected to the cathodes of the filler controlling photocells 125 and 127. One side of the primary winding of this transformer 440 is grounded and the other side is connected to the line 225 which leads from the secondary of the transformer 224. The cathodes of the photocells 153 and 154, which control the weight classification circuits of the checkweighing unit, are connected in parallel to the line 231, which is grounded. The anode of the photocell 153 is connected by a line 442 to a grid of a thyratron tube 443, and the anode of the photocell 154 is connected by a line 444 to a grid of a thyratron tube 445. As will later appear, the tube 443 amplifies current from the photocell 153 and controls circuits for classification of the charge being checkweighed from correct to overweight, and the tube 445 amplifies current from the photocell 154 and controls circuits for classification of the charge from under to correct weight. The line 441 is a common ground lead from one side of each of the three secondary windings of the transformer 440 and this provides ground for the resistances 446, 447 and 448 connected therein. The line 441 has connected therein a movable contact arm 449 of a relay 450 which is controlled by the tube 443. The resistance 447 has a movable contact arm 451a in contact therewith and this arm is connected to a resistance 452a which is connected to the first-mentioned grid of the tube 443. Thus, there is provided a potentiometer which controls the grid bias on the tube 443. The other grid of the tube 443 is connected to a line 451 which connects to the line 441. The cathode of the tube 443 is also connected to this line 451. The heater of this tube is grounded and is connected to one side of the secondary winding of the transformer 440 by a line 452. The plate of this tube is connected by a line 453 to the coil of the relay 450, this line including a resistance 454. Connected to the line 441 is a line 455 which includes the resistances 455a, 456 and 457, the line 441 also connecting to a line 458. The line 458 connects at one end to the line 441, and includes a contact point 459 of a relay 460. Associated with the resistance 456 is a movable contact arm 461 which connects with the resistance 462 that is connected to the first-mentioned grid of the tube 445. Thus, there is provided a potentiometer for controlling the grid bias on the tube 445. The other grid of the tube 445 is connected by a line 463 to the line 455. The cathode of this tube is also connected to the line 463. The heater of this tube 445 has one side grounded and the other side is connected to the line 452. The plate of this tube is connected by a line 464, having a resistance 465 therein, to the coil of a relay 466 which is controlled by the tube 445.

Connected parallel with the coil of the relay 450 is a condenser 467 and these members are connected to the line 441 which includes a contact point 469 of the relay 450. The line 441 is connected to the contact point 470 of a time-delay relay 471. The coil of this relay receives voltage by means of the lines 211 and 331 and the relay includes the movable contact arm 472 which is associated with the point 470 but is spaced therefrom with the coil of the relay normally deenergized. The arm 472 is connected in the line 441 which connects to the power line 458. A condenser 473 is connected parallel with the coil of the relay 466, and these members are also connected to the line 441. An underweight classification light 474 is connected in a line 475 which runs from the line 464 to the line 441. An overweight classification light 476 is connected in a line 477 which is connected to the line 475 and to the line 453. The relay 460 is also a time-delay relay and includes the ganged arms 478 and 479. The arm 478 is connected to one side of a condenser 480, the other side being grounded. The arm 479 is connected in the line 458, along with the contact point 459 with which it is associated. The arm 478 moves between a contact point 481, which is connected to the line 421 in which the coil of a relay 482 is connected, and a contact point 468 which is connected to one side of a resistance, the other side being grounded. With the coil of the relay 460 normally deenergized, the arm 478 is in contact with the point 481 and the arm 479 is in contact with the point 459.

As will be explained more in detail later, the time-delay relay 471 prevents voltage from being applied to the classification circuits until the thyratron tubes 443 and 445 have reached a stable operating temperature. Also, the time-delay relay 460 provides a sufficient interval, after return of the checkweighing bucket 110 to its original horizontal position, to permit balance of the checkweighing lever 111 before the classification is made on the checkweighing unit 23. The tubes 443 and 445, as previously indicated, control the classification relays 450 and 466, respectively.

The overweight classification relay 450 includes the arm 449, previously mentioned, and the arm 483 ganged therewith. The arm 449 is associated with the contact point 469, previously mentioned, and the arm 483 is associated with a contact point 484. With the coil of the relay 450 normally deenergized, the arm 449 is spaced from the point 469 and the arm 483 is in contact with the point 484. The point 484 is connected in a power supply line 485 in which the two coils of a double-coil relay 486 are connected. The relay 486 includes the ganged movable contact arms 487, 488, 489, 490, 491, 492, and 493, the arm 489 serving no purpose. The arm 487 cooperates with a contact point 494 and the grounded arm 488 cooperates with a contact point 495. The arm 490 moves between the contact points 496 and 497, the arm 491 moves between the contact points 498 and 499, the arm 492 moves between the contact points 500 and 501, and the arm 493 is associated with the contact point 502. With the coils of the relay 486 normally deenergized, the arm 487 is spaced from the point 494, the arm 488 is spaced from the point 495, the arm 490 is in contact with the point 497, the arm 491 is in contact with the point 499, the arm 492 is in contact with the point 501, and the arm 493 is spaced from the point 502. The underweight classification relay 466 includes the ganged arms 503 and 504, the arm 503 serving no purpose, the arm 504 contacting with a contact point 505 when the coil of the relay 466 is normally deenergized. The point 505 is connected to a line 506 in which the coils of a double-coil relay 507 are connected, line 506 connecting to the power line 485. The arm 504 is connected in the line 506 along with the point 505. With the coil of the relay 466 normally energized, the arm 504 contacts the point 505. The relay 507 includes the ganged contact arms 508, 509, 510, 511, 512, 513, and 514. The arm 508 cooperates with the point 515 and the grounded arm 509 cooperates with the point 516. The arm 511 moves between the contacts point 517 and 518, the arm 512 moves between the contact points 519 and 520, the arm 513 moves between the contact points 521 and 522, and the arm 514 moves between the contact points 523 and 524. With the coils of the relay 507 normally deenergized, the arm 508 is spaced from the point 515, the arm 509 is spaced from the point 516, the arm 511 is in contact with the point 518, the arm 512 is in contact with the point 520, the arm 513 is in contact with the point 522, and the arm 514 is in contact with the point 524. The point 494 of the relay 486 is connected to the line 485, the point 495 is also connected to the line 485, the point 496 is connected to a line 525, the point 497 is connected to a line 526, which also connects to the line 525, the point 498 is connected to a line 527, the point 499 is connected to a line 528 which connects to the line 527, the point 500 is connected to a line 529 which connects to the line 485, the point 501 is connected to a line 530, and the point 502 is connected to a line 531 which connects to the line 485. The arm 490 is connected in the line 526 which includes the point 517 of the relay 507. The line 525 connects with the line 526 and this latter line has connected therein the point 518 and the arm 511 of the relay 507. The line 527, connected to the point 498, has the overweight classification light 533 connected therein and the line 528 has the correct weight classification light 534 connected therein in series with the points 499 and the arm 491, the line 528 also having connected thereto, the point 519 of the relay 507. The line 527 connects to a line 535 in which an underweight classification light 536 is connected, this line 535 having the point 520 of the relay 507 connected therein. The line 485 has the arm 513 and the point 522 of the relay 507 connected therein. The line 531 connects with the line 485 and has the coil of a relay 537 connected therein. The arm 492 is connected in the line 530 with the point 521 of the relay 507. The arm 493 is connected in the line with the point 523 of the relay 507. The point 524 of the relay 507 is connected in the line 540 which connects to the line 531. The contact point 515, of the relay 507 is connected to the line 506, the point 516 to the line 506, the point 518 in the line 526, and the point 519 in the line 523.

The relay 482 is energized by the time-delay relay 460. This relay 482 controls energization of the relay 545 which controls energization of the relay 546 which sets-up the classification relays 486 and 507 for operation.

The relay 482 includes the movable contact arm 547 which is connected to one side of the condenser 548, the other side being grounded. The arm 547 moves between the contact points 549 and 550, being in contact with the point 550 with the coil of the relay 482 normally deenergized. The point 549 is connected to one side of a resistance, the other side being grounded. The point 550 is connected to the coil of the relay 545 by the line 552 which connects with the line 485 through the coil of the relay 545. The relay 545 includes the movable contact arm 553 which is connected in the line 556 that connects to the line 485. The arm 553 is normally spaced from a contact point 555, with the coil of the relay 545 deenergized, the contact point being connected in the line 556 in which the coil of a relay 546 is connected and which is connected to ground. The relay 546 includes the ganged movable contact arms 557, 558, 559, 560, and 561, all of which are all connected to the ground line 556. Connected between the arms 559, 560, and 561 and the ground line 556 are the condensers 562, 563, and 564, respectively. The arm 557 moves between the contact points 565 and 566, the arm 558 between the contact points 567 and 568, the arm 559 between the contact points 569 and 570, the arm 560 between the contact points 571 and 572, and the arm 561 between the contact points 573 and 574, the arms 557, 558, 559, 560, and 561 contacting the respective points 566, 568, 570, 572, and 574 with the coil of the relay 546 normally deenergized. The point 565 is connected to the line 506 by a line 575, the point 566 to the arm 508 of the relay 507 by a line 576, the point 567 to the line 485 by a line 577, the point 568 to the arm 487 of the relay 486 by a line 578, the point 569 to the line 485 by a line including the resistance 580, the point 570 to a line 581, the point 571 to the line 485 by a line 579 including the resistance 582, the point 572 to the line 583, the point 573 to one side of a resistance, the other side being grounded, and the point 574 to a movable contact arm 585 of a potentiometer 586. The contact 585 cooperates with a resistance 585a which is connected to a line 587 that includes the coil of a relay 588, the line 587 being connected to the line 485. The relay 588 also includes the grounded movable contact arm 589 which is spaced from a contact point 590 with the coil of the relay deenergized. The point 590 is connected to the line 526 which leads to the arm 511 of the relay 507. This line 526 is connected by the line 540 to the arm 514 of the relay 507. As will be explained in detail later, relay 588 controls the dump valve circuits whether the classification is overweight, underweight, or correct weight, and the interval during which this relay is energized can be varied by means of the potentiometer 586.

Power is supplied to the classification relays and other units of the circuit by means of an isolation transformer 592, the primary of which is connected in a line 593. The power lines 281 and 307 are connected to the line 593 at opposite sides of the transformer primary. A line 594 is a common ground and one side of the isolation transformer 592 secondary winding is grounded by the line 594. In series with the other side of the secondary winding of the isolation transformer 592 is a resistance 596, capacitor 597, rectifier 598, and capacitor 595 in the line 594. A rectifier 600 is connected between the capacitor 597 and the rectifier 598 to the ground line 594. This rectifier power supply, like the arrangement previously described, receives the input voltage from the transformer 592, rectifies it, and then doubles it.

The time-delay relay 471 also includes the movable contact arm 601 ganged with the arm 472. This arm 601 is connected in series in the power line 222 with the solenoid 603 of an out-of-tolerance horn, and a contact point 604 associated with the arm 601, the arm and point being out of contact when the coil of the relay 471 is deenergized. Also connected in the line 222, in series, is a contact point 605 and a movable contact arm 606 of a time-delay relay 607, the coil of which is connected in the line 221. With the coil of the relay 607 normally deenergized, the arm 606 is spaced from the point 605. Also connected in the line 221, in series, is a contact point 608 and a movable contact arm 609, of the relay 610, the line 221 connecting to the power line 593. The coil of the relay 610 is connected in a line 611 which is connected to the line 531 that connects to the line 485. With the coil of the relay 610 normally deenergized, the contact arm 609 is spaced from the point 608. The relay 537, the coil of which is connected in the line 531, includes the movable contact arm 610a which is connected to one side of a condenser 611a, the other side of the condenser being grounded. This arm 610a is movable between the contact points 612 and 613, the point 612 being connected to the line 611 and the point 613 being connected to one side of a resistance, the other side being grounded. The arm 610a contacts with the point 613 with the coil of the relay 537 normally deenergized.

The relay 588 controls energization of the relay 537. The relay 537 controls energization of the relay 610 which, in turn, controls energization of the time-delay relay 607 that controls the circuit to the out-of-tolerance horn 603 in conjunction with the arm 601 of the time-delay relay 471. The relay 607, like the relays 326, and 460, is constructed so that the time delay starts after the coil thereof has deenergized.

The line 583 leading from the contact point 572 of the relay 546 has connected therein the resistance 615 and associated movable contact 616 of a potentiometer 617.

The circuit so far described is shown in Figure 20. The remainder of the circuit which is now to be described is shown in Figure 20a.

As shown in Figure 20a, the circuit includes the selector switch decks 621, 622, 623, 624, and 625 which include the movable selector arms 626, 627, 628, 629, and 630, respectively. The arm 626 can selectively engage any of the contact points 631, 632, or 633; the arm 627 the points 634, 635, or 636; the arm 628 the points 637, 638, or 639; the arm 629 the points 640, 641, or 642; and the arm 630 the points 643, 644, and 645, for semi-automatic, automatic, or manual operation, the arms being shown set for automatic operation. The line 526 running from the classification relays 486 and 507 is connected in series to the points 632, and 635. The arm 627 is connected to the line 631 which leads from the point 497 of the relay 486. The point 633 is connected to the line 646 which connects to the line 526. The arm 626 is connected to a line 647 which connects to the arm 630. The point 631 is connected to a line 648 which connects to the line 526. The point 637 is connected to a line 649 which connects to the line 485. The point 639 is connected to a line 650 which also connects to the line 649 which is connected to the line 485. The arm 628 is connected to a line 651. The point 642 is connected to a line 652. The arm 629 is connected to the line 530. The point 644 is connected in the line 647 which includes the arm 630.

As previously indicated, the line 346 runs between the contact point 428 of the relay 425 and the coil of the relay 345. Connected in series in this line 346 are a movable contact arm 652 and an associated contact point 653 of a relay 654, and a movable contact arm 655 and an associated contact point 656 of a relay 657. Also, as previously indicated, the line 397 runs between the contact point 429 of the relay 425 and the contact arm 394 of the relay 393. Connected in series in this line are a movable contact arm 658 and an associated contact point 659 of the relay 654, and a movable contact arm 660 and an associated contact point 661 of the relay 657. With the coils of the relays 654 and 657 normally deenergized, the arms 652 and 658 contact with the respective points 653 and 659 and the arms 655 and 660 contact with the respective points 656 and 661. The line 583, as previously indicated, runs from the point 572 of the relay 546 and includes the potentiometer 617. This line 583 is also connected in series to the movable contact arm 662 and contact point 663 of a bucket-raising deck 664 of the selector switch and to one side of the coil of a relay 665, the other side being grounded. The contact point 663 of the deck 664 is the automatic setting point and there is also provided the semi-automatic setting point 666, which is connected to the line 583, and the manual setting point 667. The coil of the relay 665 is energized through the line 583 from the setting-up relay 546 only when arm 662 of deck 664 is on automatic or semi-automatic position, and its period of energization can be varied by the potentiometer 617. The line 581, as previously indicated, runs from the contact point 570 of the relay 546 and to one side of the coil of the relay 668, the other side being grounded. The coil of this relay 668 is energized through the line 581 from the setting-up relay 546. This relay 668 includes the movable contact arm 669 which is connected in the line 651, and the associated contact point 670 which is connected to one side of the coil of a relay 671, the other side of which is grounded, and to the contact point 672 thereof. The coil of this relay 671 is energized by the relay 668 when the switch deck 623 is set on manual or semi-automatic position. The arm 669 is spaced from the contact point 670 with the coil of the relay 668 normally deenergized. The relay 671 also includes the movable contact arms 673 and 674 which are ganged together. The arms 673 is connected in the line 651 and the arm 674 is connected in the line 593.

The line 485, which runs from the classification relays 486 and 507, connects in series to the contact points 677 and 678, the movable contact arm 679 and to one side of the coil of a relay 680, the other side being grounded. The points 677 and 678 and the arm 679 are part of a relay 681. This relay 681 has one side of its coil connected in the line 652 and its other side grounded. This relay 681 also includes an arm 682 which is ganged with the arm 679. The arm 679 cooperates with the point 678 and the arm 682 cooperates with the point 677. The arm 682 is spaced from the point 677 and the arm 679 is in contact with the point 678 with the coil of the relay 681 normally deenergized. The arm 682 is connected to the line 652. The relay 680 includes the ganged arms 683 and 684, the arm 683 serving no function and the arm 684 cooperating with a contact point 685 from which it is spaced with the coil of the relay 680 normally deenergized. The relay 681 is energized by the classification relays 486 and 507 only on out-of-tolerance loads and only when the switch deck 624 is set for manual operation. This relay will control energization of the relay 680. The point 685 of the relay 680 is connected to a line 686 and the arm 684 thereof is connected to a line 687. These lines 686 and 687 may be connected to suitable apparatus (not shown) for moving a receiver into position to receive out-of-tolerance charges dumped from the checkweighing bucket 110.

The line 650 connects to the contact arm 688 of a deck 689 of a selector switch which also includes the semi-automatic setting point 690, the automatic setting point 691, and the manual setting point 692. The point 690 is connected to a line 693 which connects to one side of the coil of a relay 694, the other side of the coil being grounded. The coil of this relay 694 is energized through switch deck 689, provided it is on semi-automatic position, and the deck 623 is similarly set. The relay 694 includes the ganged movable contact arms 695 and 696, the arm 695 serving no function and the arm 696 cooperating with a contact point 697 with which it contacts the coil of the relay 694 normally deenergized. The point 697 and the arm 696 are connected in series in the line 593 along with a point 699 and an associated movable contact arm 701 of the relay 665. The arm 701 is spaced from the point 699 with the coil of the relay normally deenergized. The line 593 connects to a line 700. The line 647, running from the switch deck 625, connects with a line 702, which connects with the line 593. This line 702 has the coil of a relay 703 connected therein. This relay is normally deenergized and includes a movable arm 704 which normally contacts a contact point 705 connected to one side of a resistance which has its other side grounded, the arm 704 being connected to one side of a condenser 707 which has its other side grounded. The arm 705 is normally in contact with the contact point 705 with the coil of the relay 703 deenergized. A contact point 708 of the relay 703 is connected to a line 709 in which the coil of a relay 710 is connected, the line 709 connecting to the line 702. The relay 710 includes the movable contact arm 711, which is connected to one side of the condenser 712 which has its other side grounded. The arm 711 moves between the contact points 713 and 714, the arm being in contact with the latter with the coil of the relay 710 normally deenergized. The point 713 is connected to the resistance 715 which is connected to the line 702. The point 714 is connected to a line 716 in which the coil of a relay 717 is connected, one side of this coil being grounded. This relay 717 includes the movable contact arm 718, which, with the coil of the relay 717 normally deenergized, is spaced from a cooperating contact point 719. The arm 718 and the point 719 are connected in series in a line 720, in which the coil of a relay 721 is also connected, one side of this coil being grounded. The coils of the relays 703 and 710 are energized through the line 702. The relay 703 controls the time of energization of the relay 710. The relay 710 controls energization of the coil of the relay 717 and this relay, in turn, controls energization of the coil of the relay 721 which controls operation of the checkweighing bucket dump-valve 179. The relay 721 includes the ganged movable contact arms 722 and 723, the arm 722 serving no purpose. The arm 723 is connected in series in the line 220, with a contact point 724 of the relay 721, the pushbutton switch 725 for dumping the checkweighing bucket 110, and the pushbutton switch 726 for raising the bucket 110. The arm 723 is spaced from the point 724 with the relay 721 normally deenergized. Across the lines 220 and 306 there is connected the solenoid of the dumping valve 179 for the bucket 110 of the checkweighing unit 23. The solenoid of the raising valve 178 for the bucket 110 of the checkweighing unit 23 is connected in the line 306 and this line 306 is connected by a line 727 to one of the contact points of the switch 726. The coil of the relay 654 is connected in a line 728 which runs from the line 306 to the line 593. The coil of the relay 657 is grounded at one side and its other side is connected to a line 729 in which the contact point 730 and the movable contact arm 731 of a time-delay relay 732 are connected in series, the line 729 connecting to the line 702. The line 702 is also connected to the movable contact arm 733 of a time-delay relay 734. The relay arm 731 is ganged with an arm 739 which serves no purpose and the arm 731 is spaced from the point 730 with the coil of the time-delay relay 732 normally deenergized. The coil of the relay 732 is connected in the line 593 and this line also has connected therein a contact point 735 of the relay 671. The arm 674 of this relay is also connected in series in the line 593 which connects to the line 220. The coil of the time-delay relay 734 is connected in the line 709. This relay also includes the arm 736 which is ganged with the arm 733. The arm 733 is associated with the contact point 737 and the arm 736 is associated with the contact point 738, the arms being spaced from the points with the coil of the relay 734 normally deenergized. The arm 736 is connected in the line 306, which connects with the line 593, and the point 738 is also connected in this line 306. The point 737 is connected in the line 702 and the coil of the relay 741 is connected in this line, one side of this coil being grounded. This relay 741 includes the ganged movable contact arms 742, 743, and 744, the arms 742 and 743 serving no purpose. The arm 744 is grounded and is associated with a contact point 745 from which it is spaced with the coil of the relay 741 normally deenergized. The point 745 is connected to the line 702. The line 700, running between the switch deck 750 and the relay 734, has one section 746 of a pushbutton dumping-switch for the bucket 110 of the checkweighing unit 23, the other section 747 being connected in the line 651, which runs from the arm 673 to the line 702, the two pushbutton sections being ganged together, with the section 746 normally open and the section 747 normally closed. The line 700 connects also to an automatic setting contact point 751 and a semi-automatic point 749 of a deck 750 of the selector switch which also has a manual point 748. This switch deck also includes a movable selector arm 752 which is connected by a line 753 to the line 220. The coil of the relay 654 is energized through the line 728 and the line 306 under the control of the time-delay relay 734 as will be explained in detail later. The coil of the relay 657 is energized through the line 729 under the control of the time-delay relay 732. The relays 654 and 657 cooperate in controlling energization of the coil of the relay 345, which controls the action of the tilting valve 177 for the bucket 110 of the weighing unit 22, and lock-in with the relay 393, which operates the raising valve 176 of the weighing unit 22, as will be explained more in detail later. The coil of the relay 732 is energized under control of the relay 671. The coil of the relay 734 is energized through the switch deck 750, provided it is set for semi-automatic or automatic operation, and this relay controls energization of the coil of the relay 741, and activation of the raising valve 178. The relay 741 controls energization of the coil of the relay 703. The switch sections 746 and 747 serve as a manual switch for activating the dumping valve 179 of the checkweighing unit 23. The switch 725 also serves as manual means to activate the dumping valve 179. The switch 726 serves as a manual means for activating the raising valve 178. The switch composed of sections 746 and 747 can be actuated for manually controlling the dumping cycle of the checkweighing unit 23. The time-delay relays 607, 732, and 734 are also of the type that the time delay starts after the coil of the relay has deenergized.

Direct current is supplied for the classification circuits by means of the isolation transformer 754 which has its primary connected to the lines 220 and 728. The secondary of the transformer 754 is connected in a common ground line 755 which has connected in it, in series, a condenser 756, the transformer secondary, a resistance 757, a condenser 758, and a rectifier 759, the line 755 connecting to the line 702. Across the line 755 is connected a line 760 which has a rectifier 761 connected therein. Like the similar direct current power-supplying arrangements previously described, this arrangement receives the input voltage from the transformer 754, rectifies it, and then doubles it.

Although the selector switch decks 315, 319, 621, 622, 623, 624, 625, 664, 689, and 750 are shown at widely separated locations in the circuit, it is to be understood that these decks are all part of the same switch and that the selector arms of all decks are ganged together so that all are set simultaneously on corresponding automatic, semi-automatic, or manual selecting points.

Our weighing machine will now be described, in its operation, with all the selector switch decks 315, 319, 621, 622, 623, 624, 625, 664, 689, and 750 in automatic position. The main switch 213 will be closed and this will energize the dial lights 216 and 217. The manual weighing bucket-raising switch 403 will be open. The manual feeder switch 283 will be closed and the pushbutton feeder switch 319a will be open. The manual filling switch 324 will be open. The medium-feed switch 292 will be closed. The manually operable dumping switch 380 for the weighing bucket will be open. The slow-feed test switch 298 will be closed. The manual weighing bucket dumping switch 414 will be closed. The manually operable switch for controlling dumping of the checkweighing bucket 110 will have its section 746 open and its section 747 closed. The manual switch 725 for controlling dumping of the bucket 110 will be open and the manual switch 726 for controlling raising of the checkweighing bucket will also be open. At the beginning of the cycle, the lever 60 of the weighing unit 22 and the lever 111 of the checking unit 23 will both be in underweight position, thus blanking the phototubes 125, 127, 153, and 154. The fast-feed microswitch 115, which is actuated by the lever 60, will be closed, thus energizing the relay 267 and the fast-feed indicating light 268.

With the lever system in the underweight position and the phototubes 125 and 127 blanked, the thyratron tubes 229 and 233 are conducting, thus energizing the medium-feed relay 249 and the slow-feed relay 241. The relay 249 controls the relay 279 and the medium-feed indicating light 278 and the relay 241 controls the relay 270 and the slow-feed indicating light 271. Thus, the medium-feed light 278 and the slow-feed light 271 are on and the fast-feed light 268 will be on because the fast-feed microswitch 115 is closed, at the beginning of the feed cycle. The vibrating unit 35 is energized at this time, due to the fact that the fast-feed microswitch 115 is closed, so that material is being fed at a fast rate from the main chute 28. The rectifier 284 supplies 110 volt unregulated and unfiltered D. C. to the vibrating unit 35 through the contact arm 295 and the point 290 of the fast-feed relay 267, since the relay 267 has been energized by closing of the fast-feed microswitch 115, and through the contact arm 300 and the contact point 302 of the medium-feed relay 279, which has been energized by the tube 233.

As material is fed from the feeder into the weighing bucket 52, the lever 60 starts a continuous movement towards balanced position. At the instant the weighing lever 60 leaves the underweight position, the fast-feed microswitch 115 is opened and thereby the fast-feed relay 267 and the fast-feed indicating light 268 are deenergized. When the fast-feed relay 267 is deenergized, the vibrating unit 35 serves to actuate the main chute 28 to deliver material at a medium rate of speed since now the rectifier 284 supplies the current to the vibrating unit through the medium-feed rheostat 287 and the fixed resistance 291, through closed switch 292, through the arm 295 and the point 293 of the fast-feed relay 267, which at this time is deenergized because of the opening of the fast-feed microswitch 115, and through the contact arm 300 and the point 302 of the medium-feed relay 279 which is still energized by the tube 233, the medium-feed light 278 being on at this time. Upon further movement of the weighing lever 60 towards balanced position, the flag 134 carried thereby moves to such a position that light from the source 122 is permitted to reach the phototube 125. This causes the thyratron tube 233 to stop conducting and, therefore, causes deenergizing of the medium-feed relay 249 which, in turn, deenergizes the medium-feed relay 279 and the medium-feed light 278 since the contact arm 264 moves away from the point 265 upon deenergizing of the relay 249. At the instant that the relay 279 is deenergized, the flow of current to the vibrating unit 35 is interrupted by the breaking of the contact arm 300, of the relay 279 away from the point 302. At the same instant, current is supplied to the slow-feed vibrating unit 39 by the rectifier 286 through the rheostat 296 and the contact arm 299 and the point 301 of the relay 279, which are engaged due to deenergizing of the relay 279, and through the contact arm 304 and the point 309 of the slow-feed relay 270, which is still energized, along with the slow-feed light 271, by the relay 241 under the control of the thyratron tube 229. The slow-feed vibrating unit 39 will now vibrate the chute 40 to cause it to slowly feed the pellets, a single pellet at a time, into the weigh scale bucket 52, the fast-feed vibrating unit 35 being inoperative. This will continue the movement of the weighing lever 60 towards balanced position. When the weighing lever 60 comes to complete balance, the phototube 127 is illuminated by the light source 122, due to movement of the flag 133 out of the light beam, and this causes the thyratron tube 229 to stop conducting and thereby deenergizes the slow-feed relay 270 and the slow-feed indicating light 271 by breaking the arm 261 of the relay 241 away from the point 262. Deenergizing of the relay 270 breaks the arm 304 of the relay 270 away from the point 309 which interrupts the flow of current to the vibrating unit 39.

During the time the slow-feed relay 270 is energized, the contact arm 310 thereof energizes the point 313 and energizes the relay 425 through the deck 315 of the selector switch, which is in automatic position. Also, during the time the slow-feed relay 270 is energized, the relay 317 is energized through the contact arm 311 and the point 311a of the relay 270. However, it will be noted that this relay 317 stays energized, regardless of the condition of the relay 270, since it is locked in through the contact arm 407 and the point 406 and is energized as long as the manual weighing bucket dumping switch 414 remains closed. When the selector switch deck 315 is in automatic or semi-automatic position, the relay 317 has no function. This relay 317 performs an operative function on manual operation only, to be explained later.

During the time that the relay 425 is energized, the condenser 431 is charged through the contact arm 426 and the point 430 of the relay. At the instant that the relay 425 is deenergized, the bucket-tilting or dumping control relay 345 is energized for the period it takes the condenser 431 to discharge through the contact arm 426 and the point 428 of the relay 425, the arm 652 and the point 653 of the relay 664, the arm 655 and the point 656 of the relay 657, and the coil of the relay 345 to ground. At the same instant that the relay 425 is deenergized, current is supplied to the coil of the bucket-raising relay 400 which energizes the weighing bucket raising valve 176 which lifts the weighing bucket 52 from the weighing lever 60, the current being supplied to the relay 400 through the contact arm 427 and the point 429 of the relay 425, the contact arm 658 and the point 659 of the relay 654, the contact arm 660 and the point 661 of the relay 657, and the contact arm 394 and the point 396 of the relay 393. When the bucket-raising relay 400 is energized, the arm 402 thereof is moved into contact with the point 404 thereby supplying current to the solenoid of the raising valve 176.

The relay 349 is energized through the contact arm 344 and the point 347 of the relay 345. Energizing the relay 349 charges the capacitor 352 through the arm 350 and the point 353 of the relay 349. Through the contact arm 351 and point 355 of the relay 349 this energizes the time-delay relay 326. Energizing of the relay 326 prevents recycling of the feeding unit 21 by disconnecting one side of the current applying circuits from the coils of the medium-feed relay 249 and the slow-feed relay 241 by breaking the contact arm 324 of the relay 326 away from the point 325. As previously indicated, the relay 326 is a time-delay relay in which the time delay starts after the coil thereof is deenergized and the delay is set so that it is sufficient to allow the weighing bucket 52 to go through its dumping cycle and then to return to its position on the scale lever 60 before material is again fed from the feeding unit 21 into the bucket.

The energizing period of the relay 349 is the same as the energizing period of the relay 345. When the condenser 431 of the relay 425 is discharged, the relays 345 and 349 are deenergized since the flow of current to the relay 345 stops and the arm 344 thereof breaks away from the point 347, thereby deenergizing the relay 349. Deenergizing of the relay 349 removes current from the time-delay relay 326 which starts the time-delay thereof. Upon deenergizing the relay 349, the relay 359 is energized through the arm 350 and the point 354 of the relay 349. Discharging of the capacitor 352, which was charged while the relay 349 was energized, through the contact arm 350 and the point 354 of the relay 349, energizes the relay 359 through the potentiometer 357 which can be adjusted to vary the energizing time of this relay. Energizing the relay 359 causes the relay 364 to be energized through the contact arm 360 and the point 363 of the relay 359. The time delay which occurs between the operation of the relays 349 and 345 and operation of the relays 359 and 364 gives sufficient time for the bucket 52 to be raised from the lever 60 before the bucket is tilted to discharge its contents.

The solenoid of the dumping valve 177 of the weighing unit 22 is energized through the contact arm 367 and the point 371 of the relay 364. The potentiometer is adjustable to adjust the time interval that the relay 359 is energized which indirectly controls the energizing interval of the relay 364. Varying the time interval of energization of these relays permits the weighing bucket 52 to remain tilted forwardly for longer or shorter periods, depending on the time it takes the pellets to discharge from the bucket. The time-delay relay 460, associated with the classification circuits of the checkweighing unit 23, is energized through the contact arm 366 and the point 370 of the relay 364 while it is energized. Energizing the relay 460 discharges the capacitor 480, through the contact arm 478, the point 468, and the resistance associated therewith to ground, and also breaks the contact arm 479 from the point 459 and removes current from the resistances 457 and 448, associated with the respective tubes 445 and 443. Lowering of the grid bias of the thyratron tubes 443 and 445 in this manner causes these tubes to continue to conduct, regardless of whether or not the classification phototubes 153 and 154 are illuminated or blanked. This allows the checking lever 111 to balance and stop oscillating, after the contents of the weighing bucket 52 is discharged into the checkweighing bucket 110, so that when classification is made, the checking lever 111 will be absolutely stationary. A time delay starts after the relay 460 is deenergized. This relay, however, is energized during the same period that the weighing bucket dumping valve operating relay 364 is energized and when the condenser 352 is fully discharged, which occurs while the relay 349 is energized, the relay 359 deenergizes and its contact arm 360 breaks away from the point 363 and thereby deenergizes the relay 364. This removes current from the solenoid of the weighing bucket dumping valve 177 by separating contact arm 367 of the relay 364 from the point 371 and the weighing scale bucket 52 will be returned to a horizontal position. Also, at the same instant, current is removed from the coil of the relay 460, by breaking of the contact arm 366 of the relay 364 away from the point 370, and the relay 460 starts its time delay. This time delay provides a time interval before classification is made by the checkweighing unit 23 which allows the checkweighing lever 111 to balance after receiving the contents of the weighing bucket 52 in its bucket 110.

The relay 364, which activates the weighing bucket dumping valve 177, charges the condenser 372 through its contact arm 365 and the point 369 when the relay is energized. Then deenergization of this relay breaks its contact arm away from the point 369 and causes it to engage the point 366 which discharges the condenser 372 and energizes the relay 384. The time interval of energization of the relay 384 is adjustable by adjusting the potentiometer 377, and increasing or decreasing this time interval gives the weighing scale bucket 52 sufficient time to return to a horizontal position before it is lowered onto the weighing lever 60. Energizing the relay 384 charges the capacitor 389 through the arm 385 and the point 390 of the relay, upon deenergizing the relay 384 which occurs when the condenser 372 is fully discharged. The condenser 389 is discharged through the arm 385 and the point 386 of the relay 384 and this energizes the relay 393 which, in turn, deenergizes the relay 400 by breaking the arm 394 of the relay 393 away from the point 396. Deenergizing the relay 400 removes current from the solenoid of the raising bucket valve 176 and allows the weighing bucket 52 to return to its original lower position where it is supported by the lever 60. Energization of the relay 393 causes it to energize the relay 399 through the contact arm 394 and the point 395 of the relay 393. This relay 399 locks in through its hold-in circuits connected to its arm 411 and its contact point 419. This relay 399 performs no function when the selector switch is set in automatic position. About midway through the interval during which the relay 393 is energized, the time delay relay 326 times out and closes the contact arm 324 thereof on the point 325, thus connecting current to the relays 249 and 241 and starting a new feed cycle. Even when the relay 393 deenergizes and arm 394 thereof contacts the point 396, current is not applied to the relay 400 since the relay 425 is energized, thus breaking the contact arm 427 from the point 429 which previously supplied current to the relay 400 through the relays 664, 657, and 393, as previously explained. The relay 425 is energized under control of the relays 249 and 241, as previously explained.

Upon the completion of the time delay of the relay 460, the contact arm 479 thereof closes on the point 459 which applies current to the photocell amplifiers, including the tubes 445 and 443, and the classification relays 466 and 450 instantaneously position, depending upon whether the respective phototubes 153 and 154 are illuminated or blanked. If the checkweighing lever 111 is in underweight position because the charge dumped from the weighing bucket 52 into the bucket 110 thereof is of less weight than desired, the overweight phototube 153 and the underweight phototube 154 remain blanked. Thus, the thyratron tubes 445 and 443 will be conducting and unit classification relays 466 and 450 are energized, setting up classification for underweight.

If the underweight phototube 154 is illuminated, the thyratron 445 is not conducting and the underweight to correct weigh classification relay 466 deenergizes and the correct to overweight classification relay remains energized for correct weight. When the phototubes 153 and 154 are both illuminated, the thyratron tubes 445 and 443 do not conduct and the relays 466 and 450 deenergize, thus setting up overweight classification.

At the same instant that the time delay of the relay 460 times out, the condenser 480, associated with this relay, is charged through the arm 478 and the point 481 of this relay and through the coil of the relay 482. Upon the energization of the relay 482, the condenser 548 associated with it, is discharged through the arm 547 and the point 549 of this relay and through the resistance associated with the point to ground. This delay between ending of the time delay of the relay 460 and deenergizing of the relay 482, which energizes the relay 545 through the contact arm 547 and the point 550 of the relay 482, is inserted by the condenser 480 to provide sufficient time for the classification relays 466 and 450 to position before the relay 545 energizes and sets up the classification relays 507 and 486. The energizing interval of the relay 482 is for the time required to charge the capacitor 480. When the capacitor 480 is fully charged, the relay 482 deenergizes. Upon deenergizing of the relay 482, it charges the capacitor 548 through its arm 547 and point 550, which energizes the relay 545 for the period which is required to charge the condenser 548. The relay 545 is very sensitive and directly controls the relay 546 through the arm 553 and the point 555 of the relay 545. The time interval for the energizing period of the relays 545 and 546 is for the time which is required to charge the condenser 548.

We will first describe the function of the classification circuits with reference to an underweight load. When a load has been determined as underweight, the relays 466 and 450 are energized as indicated above. Upon the operation of the relay 546, its arm 557 closes on the point 565 and since the relay 466 is energized, its contact arm 504 is spaced from the point 505. The relay 507 cannot energize because one side of its coil circuit is broken by separation of the contact arm 504 from the point 505 of the relay 466. The same is true of the relay 486 because of separation of the arm 483 of the relay 450 from the point 484 and the relay 486 will remain in a deenergized condition. During the energized period of the setting-up relay 546, the condenser 562, associated therewith, is charged through the relay arm 559 and the point 569, the condenser 563 is charged through the arm 560 and the point 571, and the condenser 564 is discharged through the arm 561 and the point 573 and the associated resistance to ground.

When the condenser 548 is completely discharged, the relay 545 deenergizes, breaking its arm 553 away from the point 555 and thereby deenergizing the relay 546. At the instant the relay 546 deenergizes, it discharges the condenser 562 through its contact arm 559 and the point 570 which energizes the relay 668 (Figure 17a) for the period required to discharge the condenser 562. Operation of the relay 668 and the associated relay 671 performs no function with the selector switch in the automatic position since the circuit controlled by the relay 668 is broken at the switch deck 623 and the relay 671 is controlled by the relay 668.

Deenergizing the relay 546 will also discharge the condenser 563 through the relay arm 560 and the point 572; through the potentiometer 617 to energize the relay 665 (Figure 17a). Energizing the relay 665 causes it to supply current through its contact arm 701 and the point 697 and contact arm 696 and the point 697 of the relay 694 to energize the coil of the time-delay relay 734. This time-delay relay 734 is of the same type previously described wherein the time delay starts upon deenergization of the coil. Energizing the relay 734 energizes the solenoid of the checkweighing-bucket-raising valve 178 through the arm 736 and the point 738 of the relay 734 and also energizes the relay 654 which operates in parallel with the solenoid of the raise-valve 178. Energizing of the relay 654 breaks its arms 658 and 652 away from the respective points 659 and 653 which renders the circuit to the solenoid of the dump valve 177 (Figure 17) of the weighing unit 21 inoperative until the checkweighing bucket 110 is returned to its lower position on the lever 111 and is ready to receive another charge dumped from the weighing bucket 52.

The relay 665 is energized for the period that is required to discharge the condenser 563. Upon deenergizing the relay 665, the flow of current to the time-delay relay 734 is interrupted at the contact arm 701 of the relay 665. Now the time delay of the relay 734 starts. This time delay of the relay 734 is selected to allow the checkweighing bucket 110 to dump its contents and return to a horizontal position before this time delay times out and thus breaks the circuit at the relay contact point 738 by movement of the arm 736 away from the point, and removes current from the solenoid of the raising valve 178 for the checkweighing bucket and from the coil of the relay 654. Upon deenergizing the relay 654, if the feed cycle of unit 21 has been completed, and the relay 393 is accordingly deenergized, closing of the contact arms 658 and 652 of the relay 654 with the respective points 659 and 653, will start the raising and dumping cycle of the weighing unit 22 at previously described.

Upon deenergizing the relay 546, the contact arm 561 thereof contacts the point 574 to provide circuit to the relay 588 through the potentiometer 586. The energizing period of the relay 588 is for the interval required to charge the condenser 564 and this energizing period can be varied by adjusting the potentiometer 586. Energizing the relay 588 supplies ground through its contact arm 589 and point 590 to the coil of the relay 703 through the contact arm 511 and the point 518 of the relay 507, the point 632 and the arm 626 of the switch deck 621, the arm 630 and the point 644 of the switch deck 625 to the coil of the relay 703, thereby energizing the relay 703.

The contact arm 589 and the point 590 of the relay 588 also supply ground through the arm 514 and the point 524 of the relay 507 to the coil of the relay 537. Energizing this relay 537 charges the condenser 611a, associated therewith, through its contact arm 610a and the point 612 and through the coil of the relay 610. The relay 610 remains energized for the time required to charge the capacitor 611a. The relay 537 remains energized for the same period as the relay 588. The time of energizing of the relay 610 is much shorter than that of the relay 537 and during the time that the relay 610 is energized, it supplies current through its contact arm 609 and the point 608 to the coil of the time-delay relay 607. This time-delay relay 607 is of the same type previously described and upon energizing, its contacts 606 and 605 close thereby supplying current to the out-of-tolerance horn 603, the contact arm 601 of the relay 471 being in contact with the point 604 at this time since the relay 471 is energized merely by closing of the line switch 213. This horn will operate only when a classification has been determined under or overweight due to the fact that the energizing of the relay 607 is dependent on the positions of the contacts of the classification relays 507 and 486.

Energizing of the time-delay relay 734, as indicated above, causes the relay 741 to be energized through the contact arm 733 and the point 737 of the relay 734. This provides a secondary circuit through the contact arm 744 and the point 745 of the relay 741 through the relay 703. This relay 703 remains energized for the same length of time as that of the time-delay relay 734.

Energizing the relay 703 charges the capacitor 707 through the arm 704 and the point 708 of the relay 703 and through the coil of the relay 710. This relay 710 then remains energized for the length of time required to charge the capacitor 707. Energizing the relay 710, in turn, charges the capacitor 712 through its arm 711, point 713, and through the resistance 715. On the completion of charging of the condenser 707, the relay 710 deenergizes, thus breaking its contact arm 711 from the point 713 and the condenser 712 then is discharged through the arm 711 and the point 714 of the relay 710 and through the coil of the relay 717 to ground. Energizing the relay 717 then energizes the relay 721 through the contact arm 718 and the point 719 of the relay 717 which then supplies current through the arm 723 and the point 724 of the relay 721 to the solenoid of the dumping valve 179 for the checking unit 23. As previously described, the raise-valve 178 of the checking unit has already been energized by the contact arm 736 and the point 738 of the time-delay relay 734 and the bucket 110 has been lifted from the lever 111 and is ready to be tilted forward so as to discharge its contents. The time required to discharge the condenser 712 controls the length of time that the dumping valve 179 is energized and, in turn, this period is set in accordance with the time required for the contents to discharge from the checking bucket 110. When the condenser 712 is fully discharged, the relay 717 deenergizes, thus breaking its contact arm 718 away from the point 719 and thereby deenergizing the relay 721. Deenergizing the relay 721, breaks its contact arm 723 away from the point 724 which removes current from the dump-valve 179 of the checking unit 23. Deenergizing the dumping-valve 179 allows the checking bucket 110 to return to a horizontal position. The length of the time-delay of the relay 734 is sufficient to allow the checking bucket 110 to return to a horizontal position before the raising-valve 178 is deenergized and thereby lowers the bucket to the lever 111. Timing out of the time delay of the relay 734 also deenergizes the relay 654 by breaking of the contact arm 736 away from the point 738. The relay 654 is deenergized at the same instant that the raising valve solenoid 178 of the checkweighing unit 23 is deenergized. Deenergizing of the relay 654 causes its contact arms 658 and 652 to make contact with the points 659 and 653, respectively. The relay 657 serves no function with the selector switch deck 623 in automatic position and this relay 657 always remains deenergized and, therefore, its contact arms 660 and 655 are always in contact with points 661 and 656 respectively, with the deck 623 in automatic position. Deenergizing of the relay 654 thus completes the circuit to the relays 345 and 400 of the weighing unit 22, the weighing bucket 52 then proceeds to dump its contents into the checkweighing bucket 110. Thus, the dumping cycle of bucket 52 is not started until the bucket 110 has been returned to upright position so that it will properly receive the contents dumped from the bucket 52.

The underweight classification light 536 was illuminated through the contact arm 512 and the point 520 of the relay 507, since this relay was deenergized. This classification light will stay on until the next classification is made and will remain on if the classification is the same. If the classification changes, this light will be turned off by breaking of the contact arm 512 away from the point 520 connected to the light 536.

This then completes one automatic cycle of our automatic weighing machine, that is, the underweight cycle.

We will now describe the function of the checkweighing unit 23 when the load is determined correct weight. When the checking lever 111 balances after being underweight and the phototube 154 is illuminated, the thyratron tube 445 stops conducting and the relay 466 becomes deenergized. Operation of the time-delay relay 460, relays 482, 545, 546, 588 and 665 is the same as previously described with reference to the underweight classification function. Upon energizing of the relay 546, there is a path provided for ground through the contact arm 557 and the point 565 of the relay 546, thereof to the coils of the relay 507 by way of the contact arm 504 and the point 505 of the relay 406. Immediately upon energizing the relay 507, a secondary lock-in circuit is provided to the coils of this relay through the contact arm 509 and the point 516 of this relay 507 and this secondary lock-in circuit holds the relay 507 energized while the arm 557 of the relay 546 is completing its movement from the point 565 to the point 566 upon deenergizing of the relay 546. When the relay 546 is deenergized and arm 557 contacts with the point 566, ground is then applied through this contact arm to the coils of the relay 507 through its contact arm 508 and the point 515. The relay 507 will remain in this energized position regardless of the position of the arms 503 and 504 of the relay 466.

The relay 588 performs the same function as described with reference to the underweight function and this time ground is supplied through its arm 589 and the point 590 to the relay 703 by way of the contact arm 511 and the point 517 of the relay 507, the contact arm 490 and the point 497 of the relay 486, the arm 627 and the point 635 of the switch deck 622, the arm 626 and the point 632 of the switch deck 621 and the arm 360 and the point 644 of the switch deck 625 to the coil of the relay 703. The dumping of the checkweighing unit bucket 110 will occur in the same manner as previously described for the underweight function upon energizing of the relay 703.

No circuit is provided to the relay 537, because the relay 507 is energized and its contact arm 514 contacts with the point 523 and the relay 486 is deenergized so that its contact arm 493 is spaced from the point 502.

The correct weight classification light 534 is illuminated through the contact arm 491 and the point 499 of the deenergized relay 486 and the contact arm 512 and the point 519 of the energized relay 507.

The relay 655 is energized by discharging of the condenser 563 through the contact arm 560 and the point 572 of the relay 546 and through the potentiometer 615, this time through the arm 662 and the point 663 of the deck 664 of the selector switch. The operation of the remainder of the checking unit dumping cycle is the same as described with reference to the underweight function. The relay 703 is deenergized by contact arm 744 of the relay 741 moving away from the point 745.

In dumping the checking bucket 110, the time delay between the operation of the relay 710 and the relay 717 is to allow the bucket 110 to raise from the lever 111 before it is tilted forward by energizing the relay 721 which controls the valve 179 to discharge the contents of the bucket. When classification of a load has been determined overweight, the weighing unit 22 and its controls operate in the same manner as described with reference to the underweight function.

The overweight function will now be described. When the contents of the weighing unit bucket 52 are dumped into the checking bucket 110 and the lever 111 balances with both phototubes 153 and 154 illuminated, thyratron tubes 445 and 443 no longer conduct, thus deenergizing the classification relays 466 and 450 which sets up an overweight classification. The relay 507, which is controlled by the relay 466, sets up in the same manner as described in the correct weight function and the relay 450, now being deenergized, provides current through its contact arm 483 and the point 484 to the coils of the relay 486. The relay 546 operates in the same manner as previously described and ground is supplied through its arm 583 and the point 567 and through the arm 487 of the relay 486 so as to energize such relay. A secondary lock-in circuit is provided to hold relay 486 energized through its contact arm 488 and the point 495. This secondary lock-in circuit holds the relay 486 energized while the arm 558 of the relay 546 is completing its movement from the point 567 to the point 568. Now a permanent lock-in is provided through the contact arm 558 and the point 568 of the relay 546 to the coils of the relay 486 through its contact arm 487 and the point 494. The relay 486 will remain energized regardless of the position of the contact arm 483 of the relay 450. The relay 486 remains energized until the next classification and if the classification is the same it still remains energized, whereas, if the classification is a correct or underweight classification, the relay deenergizes.

Raising of the checking bucket 110 is performed in the same manner as previously described with reference to the underweight function. For an overweight classification, the relay 588 is energized, upon deenergizing of the relay 546 through the contact arm 561 and the point 574 of the relay 546. Energizing of the relay 588 closes its contact arm 589 against the point 590 and supplies ground to initiate the dumping cycle of the checking unit. Ground is applied to the relay 703 through the contact arm 511 and the point 517 of the relay 507 the arm 490 and the point 496 of the relay 486 the arm 626 and the point 632 of the selector switch deck 621 and the arm 630 and the point 644 of the selector switch deck 625. The remainder of the dumping cycle for the checking unit is the same as previously described with reference to the underweight function.

For an overweight classification, the relays 507 and 486 are energized thus providing a circuit that operates the out-of-tolerance horn 603. This is accomplished in the same manner as described with reference to the underweight function. Ground is still supplied by the arm 589 and the point 590 of the relay 588 and for the overweight classification this supplies ground to the relay 537 by way of the contact arm 514 and the point 523 of the relay 507 and through the contact arm 493 and the point 502 of the relay 486.

The overweight classification light 533 is illuminated through the contact arm 491 and the point 498 of the relay 486 and the contact arm 512 and the point 519 of the relay 507.

When the selector switch is in the automatic position, the checking unit 23 dumps all three weight classifications. The relay 680 is provided to operate auxiliary mechanism to receive the underweight and the overweight loads from the checking unit bucket 110. The relay 681 is always deenergized with the selector switch set in automatic position. Current to operate the relay 680 is supplied through the contact arm 679 and the point 678 of the relay 681, through the contact arm 492 and the point 500 of the relay 486 and through the contact arm 513 and the point 521 of the relay 507 for overweight classification or through the arm 513 and the point 522 of the relay 507 for underweight classification. For a correct weight classification, the relay 507 is energized, thus closing its contact arm 513 against the point 521 and the relay 486 is deenergized, thus closing its contact arm 492 against the point 501, thereby breaking the circuit to the contact arm 679 of the relay 681 and, therefore, the relay 680 remains deenergized.

When the line switch 213 is first closed, the time delay relays 471 and 328 prevent voltages from being applied to the various circuits until the thyratron tubes 233, 229, 445, and 443 have reached a stable operating temperature.

We will now describe the operation of our machine with all the selector switch decks 315, 319, 621, 622, 623, 624, 625, 664, 689, and 750 in the semi-automatic position.

The operation of the fast-feed relay 267, the medium-feed relay 279 and the slow-feed relay 270 will be the same as described with reference to the automatic operation of our machine and these relays will control the main vibrating unit 35 and the auxiliary vibrating unit 39 in the same manner, as previously described.

Energizing the relay 270 moves its arm 310 into contact with the point 313 and through the arm 424 and the point 423 of the selector switch deck 315 energizes the relay 425. This relay 425 performs the same function as described with reference to the automatic operation.

The relay 345, which starts the dump cycle of the weighing unit 22, is initially energized in the same manner previously described, that is, by deenergizing the relay 425. The remainder of the dump circuits, which allow time for the weighing bucket 52 to raise from the lever 60 before it is tilted forward, the time the bucket is held in a forwardly tilted position, the returning of the bucket to horizontal position, and the lowering of the bucket onto the lever 60 is the same as described with reference to the automatic operation.

The classification relays 466 and 450 of the checking unit 23 control the respective relays 507 and 486 in the same manner as previously described and the setting-up relay 546 also functions as previously described, locking-in the circuits in the same manner. After classification has been determined, and the relay 546 deenergizes, the relay 665 is energized by means of the contact arm 560 and the point 572 of the relay 546 through the potentiometer 617, the selector switch arm 662, and the point 666. Energizing the relay 665, in turn, energizes the time-delay relay 734 through the contact arm 701 and the point 699 of the relay 665 and the contact arm 696 and the point 697 of the relay 694. This operation is also the same as previously described and at this point, the checking unit bucket raising valve 178 is energized and the bucket 110 is lifted from the lever 111.

The relay 741 is energized by the contact arm 733 of the time-delay relay 734 contacting the point 737, thereof, and the relay 703 is energized through the arm 744 and the point 745 of the relay 741 for the same period as the time-delay of the relay 732. Energizing the relay 703 continues the dumping cycle of the checkweighing unit 23, the same as previously described with reference to the automatic operation.

When the selector switch decks are in the semi-automatic position and the checking unit 23 determines that a load is correct weight, the dumping cycle of the unit 23 proceeds in the same manner as for all three weight classifications during the automatic operation.

If the checkweighing unit 23 determines that a load is underweight or overweight, the entire operation is stopped, that is, the weighing unit 22 will weigh out one weighment and hold it. The checkweighing unit 23 then will not dump an out-of-tolerance load in the semi-automatic operation of our machine. In order to then start the operation again, the manual dump switch 746—747 of the checkweighing unit 23 is manually depressed, closing the section 746 and opening the section 747, thereby causing the unit to function to dump the checkweighing bucket 110 and as soon as the dumping cycle is completed and the checkweighing lever 111 has returned to its original position after the cycle is completed, the weighing unit 22 will operate to dump the contents of its bucket 52 into the checkweighing bucket 110 and the operation will continue.

When the photocell amplifiers of the checkweighing unit 23 determine that a load is overweight, the relay 694 is energized by the contact arm 513 and the point 521 of the relay 507 and contact arm 592 and point 500 of relay 486 and, if underweight, by the contact arm 513 and the point 522 of the relay 507 and through the arm 688 and the point 690 of the selector switch deck 689. Energizing the relay 694 breaks its contact arm 696 away from the point 697 and will not allow the time-delay relay 734 to energize. If the relay 734 does not energize, the checkweighing bucket 110 remains on the lever 111 and will not dump. At the same instant that the relay 546 deenergizes, the relay 668 is energized through the contact arm 559 and the point 570 of the relay 546 by discharging the condenser 562. Energizing the relay 668 closes its contact arm 669 against the point 670 and provided relay 507 or 486 is set in an underweight or overweight position, current is supplied to the coil of the relay 671, through the selector switch deck 623, the contact arm 628 and the point 637, if overweight, through the contact arm 492 and the point 500 of relay 486, and contact arm 513 and point 521 of relay 507, if underweight current is supplied to selector switch 623 from the contact arm 513 and the point 522 of the relay 507. The relay 671 then locks in through its contact arm 673 and its point 672. Energizing the relay 671 moves its contact arm 673 against the point 672 and supplies current to the time-delay relay 732. The time-delay relay 732 is of the same type previously described and energizing this time-delay relay closes its contact arm 731 against the point 730 thus energizing the relay 657. Energizing the relay 657 opens the circuits of the weighing unit 21 and the bucket 52 thereof cannot dump until the time-delay of the relay 732 times out and at that instant, the checkweighing bucket 110 has been returned to its support on the lever 111. Deenergizing of the relay 657 then closes its contact arms 660 and 655 against the respective points 661 and 656 which triggers the dumping circuit of the weighing unit 22 and completes its dumping cycle.

In order to now dump the checkweighing bucket 110 manually, the dump switch 746—747 is depressed. This removes current from the arm 673 of the relay 671, which is in contact with the point 672, and the relay 671 then deenergizes. At the instant the relay 671 deenergizes, it breaks its contact arm 674 away from the point 735 and the time-delay period of the relay 732 starts. At the same instant that the manual dump switch 746—747 is depressed, current is applied to the coil of the time-delay relay 734 through the arm 752 and the point 749 of the selector switch deck 750. Energizing of the time-delay relay 734 then starts the dumping cycle of the checkweighing unit 23 in the same manner as previously described with reference to the automatic operation.

The relay 681, with the selector switch in the semi-automatic position, functions in the same manner as with it in automatic position.

We will now describe the operation of our machine with all the selector switch decks 315, 319, 621, 623, 624, 625, 664, 689, and 750 in manual position.

To start the material flowing from the feeding unit 21 into the weighing bucket 52, the manual fill switch 324 of the weighing unit is momentarily depressed. This supplies current through the selector switch arm 320 and the point 323 of the switch deck 319 to the coils of the feeding relays 249 and 241. The phototubes 127 and 125 are blanked because the lever 60 is in the underweight position. Consequently, as soon as the manual fill switch 324 is depressed, plate voltage is applied to the thyratron tubes 233 and 229 and the relays 249 and 241 are energized. The instant that the relay 241 is energized, its arm 240 contacts the point 248 and provides a lock-in circuit for the relays 249 and 241. The fast-feed relay 267, the medium-feed relay 279 and the slow-feed relay 270 operate and control the feeding units 35 and 39 in the same manner as described with reference to the automatic operation. Energizing the relay 270 closes its contact arm 311 against the point 311a which supplies current to the relay 317 and upon energizing this relay is locked in through its contact arm 407 and the point 406. Energizing the relay 317 closes its contact arm 408 against the point 409 and energizes the relay 425 through the selector switch arm 424 and the point 418 of the selector switch deck 315. Upon completion of the feeding cycle, the relays 241 and 270 deenergize and the weighing bucket 52 will not dump its contents until the manual dump switch 414 of the weighing unit 22 is operated. Pushbutton switch 414 is of the normally-closed type, as previously indicated, and pressing it breaks the circuit to the coil of the relay 317 through the contact arm 407 and the point 406 of the relay 317. Upon deenergizing the relay 317, its contact arm 408 breaks away from the point 409 and this deenergizes the relay 425. Deenergizing the relay 425 starts the dumping cycle of the weighing unit 22 and this cycle continues in the same manner, as previously described, with reference to the automatic operation.

When the weight checking unit 23 balances, classification is determined in the same manner as previously described in regard to the automatic operation and the weight checking bucket 110 will not dump until the manual dumping switch 746—747 of the checkweighing unit is operated. The relay 668 is energized momentarily in the same manner as previously described, with reference to the automatic operation except that a circuit now is provided through the selector switch arm 628 and the point 639 of the selector switch deck 623. The dumping cycle of the checkweighing unit 23 is the same as described in the overweight and underweight classifications of the semi-automatic operation.

The relay 680 operates in the same manner as for the automatic and semi-automatic positions of the selector switch and is energized for under or overweight classifications. This is accomplished by current being supplied through the contact arm 513 and the point 522 of the relay 507 and through the contact arm 679 and the point 678 of the relay 681 to the coil of the relay 680 for underweight classification. For an overweight classification, the relay 680 is energized through the contact arm 679 and the point 678 of the relay 681 and through the contact arm 513 and the point 521 of the relay 507 and the contact arm 492 and the point 500 of the relay 486. For correct weight classification, the relay 681 is energized through the selector switch arm 629 and the point 542 of the switch deck 624, the arm 492 and the point 501 of the relay 486 and the arm 513 and the point 521 of the relay 507. This breaks the contact arm 679 away from the point 678 of relay 681, thus preventing relay 680 from energizing.

The relay 399 is energized through the contact arm 394 and the point 395 of the relay 393 and the relay 399 then locks its contact arm 411 against the point 419 and closing of its contact arm 420 against the point 417 energizes the relay 425 through the contact arm 424 and the point 418 of the selector switch deck 315. The relay 399 works in conjunction with the relay 317 with the selector switch in manual position to prevent the weighing bucket 52 from dumping until the manual dumping switch 414 of the weighing unit is operated. Breaking the circuit at this switch 414 removes current from the arm 411 of the relay 399 and the arm 407 of the relay 319, thus deenergizing these relays. Deenergizing the relay 399 causes its arm 420 to move away from the point 417 and deenergizing the relay 319 causes its arm 408 to move away from the point 409 and remove current from the coil of the relay 425, thus deenergizing it and starting the dumping cycle of the weighing unit 22, as previously described in the automatic operation.

The underweight classification light 536, the correct weight classification light 534, and the overweight classification light 533 operate in the same manner, as previously described, with reference to the automatic and semi-automatic operation.

It will be apparent from the above description that we have provided a weighing machine which is extremely sensitive and, therefore, extremely accurate. The scale, both in its weighing and checkweighing units, is provided with an arrangement which protects the sensitive parts thereof, such as the lever bearings, from severe shocks during the dumping operation. These shocks are prevented by lifting the material-receiving bucket before dumping it and returning it to horizontal position before again supporting it on the lever. The controls of the machine are such that the scale can operate completely automatic with little attention by the operator. However, the scales may be set for semi-automatic operation or manual operation when desired.

Various other advantages will be apparent.

Having thus described our invention what we claim is:

1. A composite machine comprising a weighing machine and a checkweighing machine, said weighing machine comprising a weighing lever, a commodity receiver carried by the lever, a unit for lifting the receiver from the lever after the weighing operation is completed so that it will be independent of the lever, a unit for tilting the receiver to discharge its contents, said checkweighing machine comprising a checkweighing lever, a commodity receiver carried by the checkweighing lever in position to receive the contents discharged from the commodity receiver carried by the weighing lever, a unit for lifting the receiver from the checkweighing lever after the checkweighing operation is completed so that it will be independent of the checkweighing lever, and a unit for tilting the lifted checkweighing receiver to discharge its contents.

2. A machine according to claim 1 including means for actuating the receiver-lifting unit and the receiver-tilting unit of the weighing machine in sequence after the weighing operation is completed so as to discharge the weighed contents of the weighing receiver into the checkweighing receiver of the checkweighing machine and means for actuating the receiver-lifting unit and the receiver-tilting unit of the checkweighing machine in sequence after the checkweighing operation is completed.

3. A machine according to claim 2 wherein said means for actuating each of said units comprises a fluid-actuated ram, and a solenoid-actuated valve for controlling each of said rams.

4. A composite machine according to claim 2 including means for feeding the commodity to said commodity receiver of the weighing machine, means controlled by said weighing lever for controlling said feeding means, and means controlled by said checkweighing lever for classifying the charge in the checkweighing receiver as correct weight, overweight or underweight.

5. A composite machine according to claim 4 wherein said feeding means includes electrically-operated vibrating units, and said means controlled by the weighing lever comprises an electric circuit for controlling said electric vibrating units, said circuit including a fast-feed switch, a medium-feed switch, and a slow-feed switch actuated by said lever.

6. A composite machine according to claim 5 wherein said feeding means includes a main feeding chute and an auxiliary feeding chute, an electrically operated vibrating unit for vibrating each of said chutes independently, said fast-feed switch and said medium-feed switch being connected in said circuit to actuate said main chute vibrating unit, said slow-feed switch being connected in said circuit to actuate said auxiliary chute vibrating unit.

7. A composite machine according to claim 6 wherein said fast-feed switch is operated mechanically by said weighing lever, and photocell units connected in said circuit to said medium-feed switch and to said slow-feed switch for actuating such switches independently upon actuation by said weighing lever.

8. A composite machine according to claim 7 wherein said fast-feed switch is operated mechanically by said weighing lever, photocell units connected in said circuit to said medium-feed switch and to said slow-feed switch for actuating such switches independently upon actuation by said weighing lever, and classifying means operable by said checkweighing lever for classifying the position of the checkweighing lever as over, under or correct weight.

9. A composite machine according to claim 8 wherein said classifying means includes photocell units connected in said circuit and actuated by said checkweighing lever.

10. A composite machine according to claim 9 wherein said circuit includes a selector switch connected therein, said selector switch including selector means for setting the circuit for automatic, semi-automatic or manual operation.

11. A composite machine according to claim 10 wherein said actuating means for each of said receiver-lifting and receiver-tilting units includes a solenoid and said vibrating unit for each of said chutes includes a solenoid, all of the solenoids being connected in said circuit.

12. A composite machine according to claim 11 wherein said weighing lever carries flags for blanking the feed-control photocells at different periods during movement of the weighing lever, and said checkweighing lever carries flags for blanking the classifying photocells at different periods during movement of the checkweighing lever.

13. A composite machine according to claim 12 wherein said circuit includes a fast-feed indicating signal connected in said circuit to said fast-feed switch, a medium-feed indicating signal connected in said circuit to said medium-feed switch, and a slow-feed indicating signal connected in said circuit to said slow-feed switch.

14. A composite machine according to claim 13 wherein said classifying photocells control classifying circuits forming a part of said circuits for classifying the position of the checkweighing lever as overweight, underweight, or correct weight, and indicating signals connected in said classifying circuits for indicating the respective classifications.

15. A composite machine according to claim 14 wherein said circuit includes a solenoid actuated unit connected in said circuit and actuated when the classification circuits classify the position of the checkweighing lever as underweight or overweight.

16. A composite machine according to claim 3 including a flex engaging the weighing lever and tending to return it from underweight position towards balanced position.

17. A weighing machine according to claim 9 including adjustable means for varying the time of operation of said fast-feed switch and all of said photocell units.

18. A composite machine according to claim 11 wherein said circuit includes a time-delay relay connected therein for preventing actuation of the vibrating solenoids until the weighing bucket is returned to its original position on the weighing lever.

19. A composite machine according to claim 18 including means connected in the circuit in association with each of said solenoids for adjusting the period of energization thereof.

20. A composite machine according to claim 19 including a time-delay relay connected in the circuit to each of the bucket-tilting solenoids to delay actuation thereof until after the corresponding bucket-raising solenoid has been actuated.

21. A composite machine according to claim 20 comprising a time-delay relay connected in said circuit in association with said classification circuits to prevent functioning thereof for a predetermined period after the contents of the weighing bucket are dumped into the checkweighing bucket so as to provide an interval to permit the checkweighing lever to stop oscillating and remain in balanced position before classification.

22. A composite weighing machine according to claim 21 including a time-delay relay connected in said circuit to the dumping solenoid of the weighing unit and to the tilting solenoid of the checkweighing bucket for preventing dumping of the weighing bucket until the checkweighing bucket returns to its original position on the checkweighing lever.

23. A composite weighing machine according to claim 22 wherein the circuit includes a time-delay relay connected to the checkweighing bucket raising solenoid and to the weighing-bucket raising solenoid for delaying energization of the weighing-bucket raising solenoid, until the checkweighing bucket returns to its original position on the checkweighing lever, and means in said circuit for preventing actuation of said weighing-bucket raising solenoid until said vibrating solenoids are deenergized.

24. A composite machine according to claim 23 wherein said circuit includes a time-delay relay connected in said circuit between the checkweighing bucket tilting solenoid and the raising solenoid thereof to permit the bucket to be tilted back to its original position before it is lowered to its original position.

25. A composite machine according to claim 23 comprising an out-of-tolerance signal connected to said classification circuits and actuated whenever a classification of overweight or underweight is made by said classification circuits.

26. A composite machine comprising a material feeding unit, a weighing unit and a checkweighing unit, said material feeding unit comprising a main feeding member and an auxiliary feeding member for feeding material to the weighing unit, an electrically operated vibrating unit for vibrating each of said members independently and including a solenoid, said weighing unit comprising a weighing lever, a commodity receiver carried by the lever for receiving material from said feeding members, a unit for lifting the receiver from the lever after the weighing operation is completed so that it will be independent of the lever and including a solenoid, a unit for tilting the receiver to discharge its contents and including a solenoid, said checkweighing machine comprising a checkweighing lever, a commodity receiver carried by the checkweighing lever in position to receive the contents discharged from the commodity receiver carried by the weighing lever, a unit for lifting the receiver from the checkweighing lever after the checkweighing operation is completed so that it will be independent of the checkweighing lever and including a solenoid, a unit for tilting the lifted checkweighing receiver to discharge its contents and including a solenoid, all of said solenoids being connected in a circuit for actuating the feeding unit and for actuating the receiver-lifting unit and the receiver-tilting unit of the weighing machine in sequence after the weighing operation is completed so as to discharge the weighed contents of the weighing receiver into the checkweighing receiver of the checkweighing machine and for actuating the receiver-lifting unit and the receiver-tilting unit of the checkweighing machine in sequence after the checkweighing operation is completed, said circuit including means for controlling the feeding unit and comprising a fast-feed relay, a medium-feed relay, and a slow-feed relay, means controlled by said weighing lever for actuating said relays, said fast-feed relay and said medium-feed relay being connected in said circuit to the vibrating solenoid of the main feeding member and said slow-feed relay being connected in said circuit to the vibrating solenoid of the auxiliary feeding member, said circuit also including classifying relays for classifying the material dumped from the weighing receiver into the checkweighing receiver as correct weight, overweight or underweight, and means actuated by said checkweighing lever for controlling said classification relays.

27. A composite machine according to claim 26 wherein said circuit includes a switch connected to the fast-feed relay and actuated mechanically by said weighing lever, a pair of photocells including a photocell connected to the medium-feed relay and a photocell connected to the slow-feed relay, flags carried by said weighing lever for blanking said photocells at different intervals, said circuit also including a second pair of photocells, one of said photocells of the second pair being connected to the classification relays for classifying the position of the checkweighing lever as being from underweight to correct weight and the other of said second pair of photocells being connected to the classification relays for classifying the position of the checkweighing lever as being from correct weight to overweight, and flags carried by said checkweighing lever for blanking said photocells at different intervals.

28. A composite machine according to claim 27 wherein said circuit includes thyratron tubes connected between the first two photocells and the respective medium-feed and slow-feed relays, and thyratron tubes connected between the second two photocells and the respective classification relays.

29. A composite machine according to claim 28 wherein the mechanically actuated switch for the fast-feed relay actuates additional relays connected in said circuit to the solenoid which actuates the vibrating unit for the main feeding member, and wherein the medium-feed relay and slow-feed relay are controlled directly by thyratron tubes associated therewith, and additional relays connected in said circuit between said directly-actuated medium-feed and slow-feed relays, respectively, and said vibrating solenoids for the main and auxiliary feeding members.

30. A composite machine according to claim 29 wherein the classification relays include an under to correct weight relay controlled directly by a thyratron tube and a correct to overweight relay controlled directly by a thyratron tube, additional classification relays controlled directly by the first-mentioned relays, and a setting-up relay connected to said additional relays, and setting-up relay and said additional relays being connected to the other relays in said circuit which control the checkweighing receiver raising and tilting solenoids.

31. A composite machine according to claim 30 wherein said circuit includes signals actuated by said fast-feed switch, said medium-feed relay and said slow-feed relay, respectively, and signals connected in said circuit to said additional relays connected to the setting-up relay for indicating correct weight, underweight or overweight.

32. A composite machine according to claim 31 including additional signals connected in said circuit directly to the classifying thyratron tubes.

33. A composite machine according to claim 30 wherein said circuit includes a time-delay relay connected therein between the weighing-receiver raising solenoid and the vibrating solenoids for preventing actuation of the vibrating units until the weighing receiver is returned to its original position where it is supported on the weighing lever.

34. A composite machine according to claim 33 wherein said circuit includes a potentiometer connected therein in association with each of said solenoids for adjusting the period of energization thereof.

35. A composite machine according to claim 34 wherein said circuit includes a time-delay relay connected in the circuit between each of the receiver-tilting solenoids and the receiver-raising solenoids to delay actuation of the receiver-tilting solenoid until the receiver-raising solenoid has been actuated.

36. A composite machine according to claim 35 wherein said circuit includes a time-delay relay connected in the circuit between said weighing-receiver tilting solenoid and said classification relays so as to provide an interval after dumping of the contents of the weighing receiver into the checkweighing receiver to permit the checkweighing lever to stop oscillating and to remain in balanced position before actuation of said classification relays.

37. A composite machine according to claim 36 wherein the circuit includes a time-delay relay connected in the circuit between the tilting solenoid of the weighing receiver and the raising solenoid of the checkweighing receiver for preventing tilting of the weighing receiver until the checkweighing receiver returns to its original position on the checkweighing lever.

38. A composite machine according to claim 37 wherein the circuit includes a time-delay relay connected in the circuit between the checkweighing receiver-raising solenoid and the weighing-receiver raising solenoid until the checkweighing receiver returns to its original position supported on the checkweighing lever, and a relay connected in said circuit between said vibrating solenoids and said weighing receiver raising solenoid for preventing actuation of the latter solenoid until said vibrating solenoids are deenergized.

39. A composite machine according to claim 38 wherein said circuit includes a time-delay relay connected in the circuit between the checkweighing receiver-tilting solenoid and the raising solenoid thereof to permit the receiver to be tilted back to its original position before it is lowered to its original position in the checkweighing lever.

40. A composite machine according to claim 38 comprising an out-of-tolerance signal connected to said additional classification relays and actuated whenever a classification of overweight or underweight is made by said relays.

41. A composite machine according to claim 40 wherein said circuit includes a selector switch connected therein and including adjustable selector contact arms and associated contact points for setting the circuit for automatic, semi-automatic or manual operation.

42. A weighing machine comprising a weighing lever mounted for vertical balancing movement, a commodity receiver carried by the lever, said commodity receiver comprising a bucket, supporting means on said lever upon which the bucket rests during the weighing operation and including cooperating pin and cup bearings carried by the lever and the bucket, a frame supported independently of the lever and the bucket during the weighing operation and provided with an end which straddles the bucket, means for connecting said bucket to said frame to permit limited vertical movement of the bucket relative to the frame during the weighing operation but to permit lifting of the bucket from said supporting means upon substantial upward movement of said frame so that it will be supported by the frame, said connecting means comprising plates pivoted to the end of the frame which straddles the bucket and disposed at each side of the bucket to which they are connected by pin and slot connections which permit relative vertical movement, said plates being pivotally supported on said lifting frame, guide pins carried by said plates for engaging said bucket sides and centering it relative to said lever when the bucket is lifted from said supporting means, means for moving said frame to lift the bucket from the lever after the weighing operation is completed, said means comprising a fluid-actuated lifting ram, means for tilting the bucket on the frame to discharge the contents thereof, said means comprising a fluid-actuating tilting ram, rods pivotally connected to said plates at points spaced from the supporting pivots and connected to said tilting ram, said rods including yieldable plunger units which prevent tilting of the bucket as long as it is still supported by said supporting means, said frame being fulcrumed for vertical movement by means of a sleeve forming a part thereof and supported by a fulcrum rod extending therethrough and said plates being supported at one side of the fulcrum thereof, said lifting ram being connected to said frame at the opposite side of the pivot by a rigid arm extending from said sleeve in a direction away from the bucket, and control means for actuating said frame-moving means and said bucket-tilting means in sequence, said control means including valves for controlling said lifting and tilting rams.

43. A weighing machine according to claim 42 wherein said tilting rods are connected to said bucket by crank arms, one of said arms being a bellcrank which is also connected to said tilting ram so that when the ram is operated, it will rotate said fulcrum rod in said fulcrum sleeve.

44. A weighing machine comprising a weighing lever, a commodity receiver, means for supporting said receiver on said lever during the entire operation, means for positively discharging the contents of the receiver under control after the weighing operation, and additional means for lifting the receiver from the lever and for supporting the receiver independently of the lever before operation of said last-named means, both of said means being independent of the lever both during the weighing operation and during the dumping operation.

45. A weighing machine comprising a weighing lever of the even-balance type mounted for vertical balancing movement, a commodity receiver, means for supporting said receiver on said lever during the entire weighing operation, a frame supported independently of the lever and the receiver during the weighing operation, means for moving said frame to lift the receiver from the lever after the weighing operation is completed, additional means carried by said frame for positively tilting the receiver on the frame under control to discharge the contents thereof, and control means for actuating said frame-moving means and said receiver-tilting means in sequence.

46. A weighing scale according to claim 45 including means forming a part of the tilting means to prevent tilting of the receiver until it is lifted from the lever.

47. A weighing scale according to claim 46 wherein said tilting means comprises a ram and a connecting rod connecting said ram to said receiver, said rod including a plunger unit which yields upon predetermined resistance to the tilting movement of the receiver.

48. A weighing machine according to claim 45 wherein the means for moving said frame is a fluid-actuated ram and the means for tilting the receiver on the frame includes a fluid-actuated ram, and said control means includes valves for controlling said rams.

49. A weighing machine according to claim 45 wherein said commodity receiver is a bucket, supporting means on said lever upon which the bucket rests during the weighing operation, means for connecting said bucket to said frame to permit limited vertical movement of the bucket relative to the frame during the weighing operation but to permit lifting of the bucket from said supporting means upon substantial upward movement of said frame so that it will be supported by the frame.

50. A weighing machine according to claim 49 including guide means for centering said bucket relative to said lever when it is lifted from said supporting means.

51. A weighing machine according to claim 49 wherein said connecting means comprises plates disposed at each side of the bucket and connected to the bucket by pin and slot connections which permit relative vertical movement, said plates being pivotally supported on said lifting frame, said tilting means including rods pivotally connected to said plates at points spaced from the supporting pivots, said frame being fulcrumed for vertical movement and said plates being supported at one side of the fulcrum thereof, said ram for moving the frame being connected thereto at the opposite side of the pivot, and said ram for tilting the bucket being connected to said rods.

52. A weighing machine according to claim 51 including guide pins carried by said plates for engaging said bucket sides and centering it relative to said lever when the bucket is lifted from said supporting means.

53. A weighing machine according to claim 52 wherein said bucket-tilting rods include yieldable plunger units which prevent tilting of the bucket as long as it is still supported by said supporting means.

54. A weighing machine according to claim 53 wherein said supporting means comprises cooperating pin and cup bearings carried by the lever and the bucket.

References Cited in the file of this patent

UNITED STATES PATENTS

| | | |
|---|---|---|
| 1,986,268 | Hughes | Jan. 1, 1935 |
| 2,058,775 | Cundall | Oct. 27, 1936 |
| 2,169,465 | Hadley | Aug. 15, 1939 |
| 2,323,023 | Flanagan | June 29, 1943 |
| 2,406,934 | Williams | Sept. 3, 1946 |
| 2,451,891 | Vagim | Oct. 19, 1948 |
| 2,491,049 | Johannessen | Dec. 13, 1949 |
| 2,503,295 | Palmer | Apr. 11, 1950 |
| 2,579,708 | Smith | Dec. 25, 1951 |
| 2,581,695 | Olofsson | Jan. 8, 1952 |
| 2,616,652 | Rose | Nov. 4, 1952 |
| 2,626,042 | Aldridge | Jan. 20, 1953 |
| 2,650,791 | Adams | Sept. 1, 1953 |
| 2,669,412 | Nowak | Feb. 16, 1954 |